US011611854B2

(12) United States Patent
Zhang et al.

(10) Patent No.: US 11,611,854 B2
(45) Date of Patent: Mar. 21, 2023

(54) COORDINATED SLOT-BASED RADAR SENSING

(71) Applicant: QUALCOMM Incorporated, San Diego, CA (US)

(72) Inventors: Dan Zhang, San Diego, CA (US); Kapil Gulati, Belle Mead, NJ (US); Junyi Li, Franklin Park, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/196,913

(22) Filed: Mar. 9, 2021

(65) Prior Publication Data

US 2022/0295237 A1    Sep. 15, 2022

(51) Int. Cl.
*H04W 4/08*          (2009.01)
*H04W 72/121*        (2023.01)
*H04W 72/14*         (2009.01)
*G01S 13/87*         (2006.01)
*G01S 13/931*        (2020.01)

(52) U.S. Cl.
CPC ........... *H04W 4/08* (2013.01); *H04W 72/121* (2013.01); *H04W 72/14* (2013.01); *G01S 13/878* (2013.01); *G01S 13/931* (2013.01); *G01S 2013/9316* (2020.01)

(58) Field of Classification Search
None
See application file for complete search history.

(56) References Cited

U.S. PATENT DOCUMENTS

| 2017/0303096 | A1* | 10/2017 | Masuda | H04W 28/18 |
| 2020/0076503 | A1* | 3/2020 | Croughwell, III | G06F 13/387 |
| 2020/0092685 | A1* | 3/2020 | Fehrenbach | H04W 4/46 |
| 2021/0045093 | A1* | 2/2021 | Rao | H04W 36/0009 |

FOREIGN PATENT DOCUMENTS

| WO | WO-2017119919 A1 * | 7/2017 | |
| WO | WO-2020033086 A1 * | 2/2020 | G08G 1/22 |

* cited by examiner

*Primary Examiner* — Anh Vu H Ly
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for coordinated slot-based radar sensing. A first radar device, which may be a radar group leader, may broadcast information indicative of a wireless device group that includes the first wireless device. The first wireless device may receive, from a second wireless device that receives the broadcast information, a request to join the wireless device group that includes the first wireless device. The first wireless device may transmit, to the second wireless device based on the request, a grant or rejection to join the wireless device group that includes the first wireless device. The first wireless device may further transmit a transmission schedule to at least one wireless device of the wireless device group, where the at least one wireless device may include the second wireless device if the first wireless device transmits the grant.

29 Claims, 13 Drawing Sheets

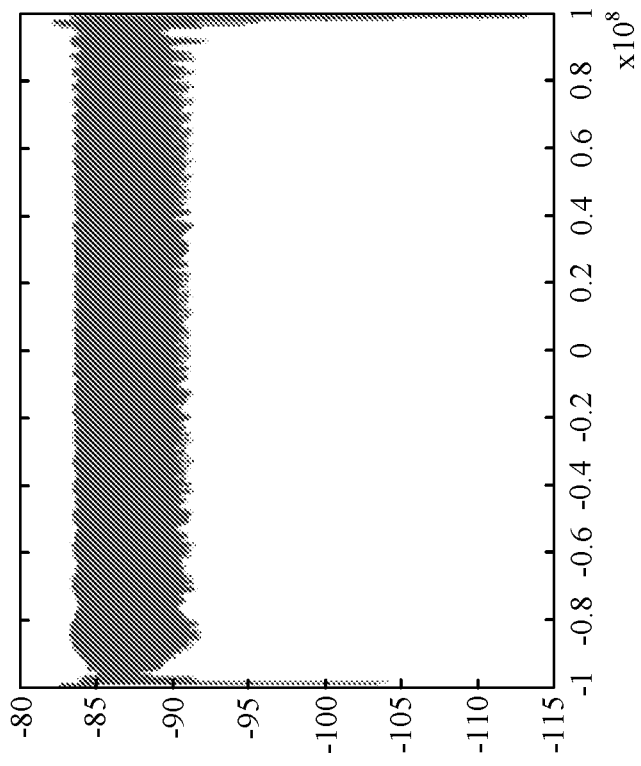
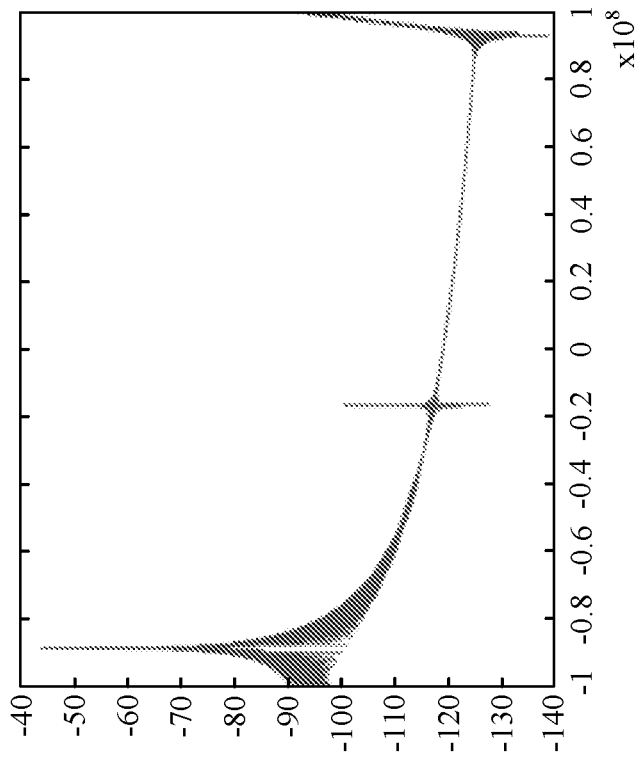
FIG. 6B
FIG. 6A

COORDINATED SLOT-BASED RADAR SENSING

BACKGROUND

Technical Field

The present disclosure relates generally to communication systems, and more particularly, to coordinated slot-based radar sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a second wireless device, a request to join a wireless device group that includes the first wireless device, the request based on broadcast information indicative of the wireless device group; transmit, to the second wireless device based on the request, a grant to join the wireless device group that includes the first wireless device; and transmit a transmission schedule to at least one wireless device of the wireless device group, the at least one wireless device including the second wireless device.

In an aspect of the disclosure, a method, a computer-readable medium, and an apparatus are provided. The apparatus may receive broadcast information indicative of a wireless device group that includes a first wireless device; transmit, to the first wireless device based on the broadcast information, a request to join the wireless device group that includes the first wireless device; and receive, based on the request, an indication of whether the second wireless device is granted membership to the wireless device group that includes the first wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A-6B illustrate range spectrum diagrams.

DETAILED DESCRIPTION

Figure 1:
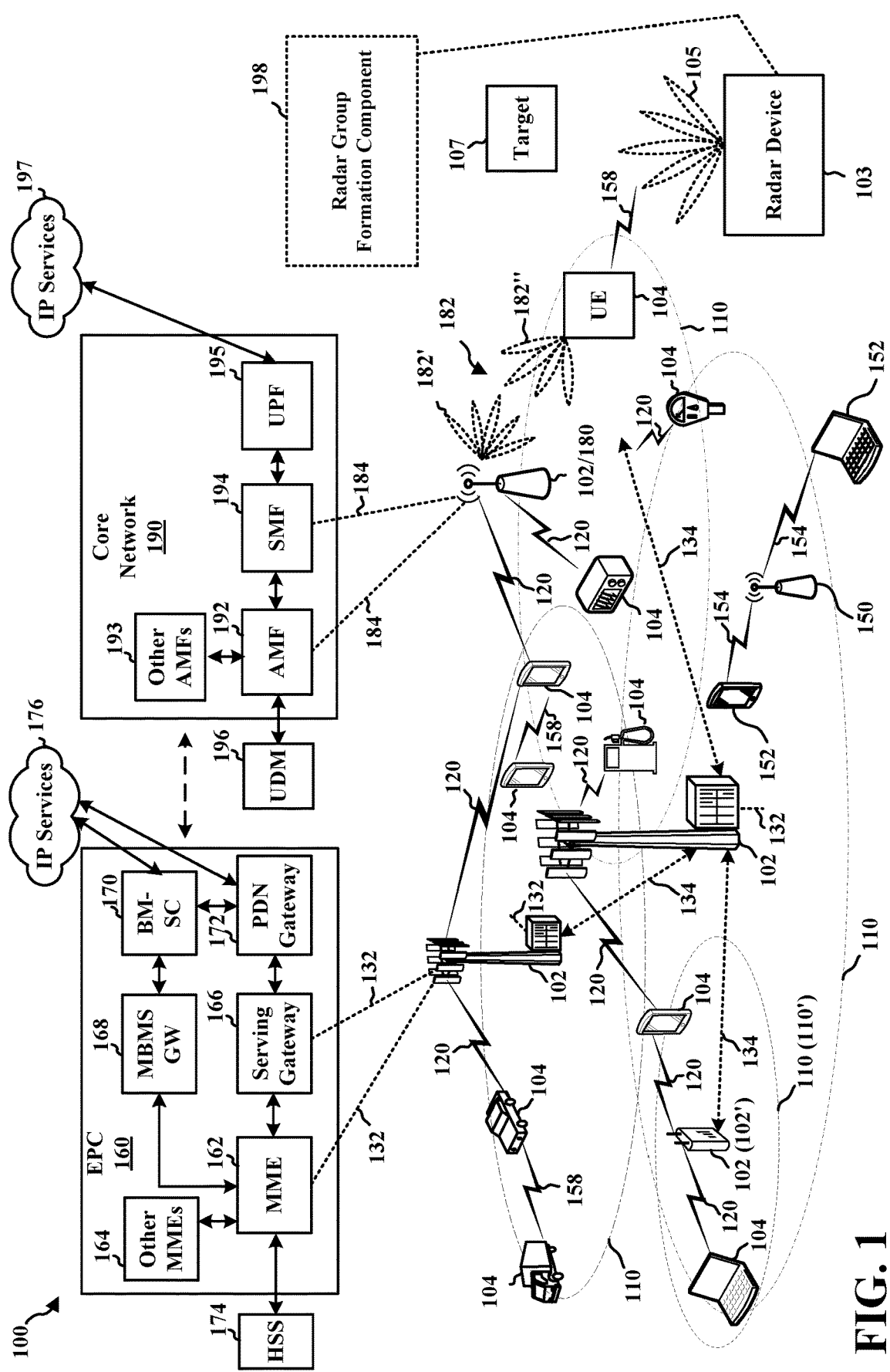
FIG. 1 is a diagram illustrating an example of a radar device and a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating an example of a wireless communications system and an access network in which base stations 102 or 180 may wirelessly communicate with user equipments (UEs) 104. Some wireless devices may perform radar signal sensing. For example, a radar device 103 may transmit a wireless signal 105 and use information about the signal to image an environment or determine information about a target 107 based on range, doppler, and/or angle information determined from the wireless signal. The signal may include a defined waveform, such as a frequency modulated continuous wave (FMCW) or a pulse or chirp waveform.

In some examples, the radar device 103 may transmit a radar signal to determine information about a target or an environment. A radar group formation component 198 included in the radar device 103 may be configured to receive, from a second wireless device, a request to join a wireless device group that includes the first wireless device, the request based on broadcast information indicative of the wireless device group; transmit, to the second wireless device based on the request, a grant to join the wireless device group that includes the first wireless device; and transmit a transmission schedule to at least one wireless device of the wireless device group, the at least one wireless device including the second wireless device. The radar group formation component 198 may be further configured to receive broadcast information indicative of a wireless device group that includes a first wireless device; transmit, to the first wireless device based on the broadcast information, a request to join the wireless device group that includes the first wireless device; and receive, based on the request, an indication of whether the second wireless device is granted membership to the wireless device group that includes the first wireless device.

A received signal may be compared to the transmitted signal to determine information about the target 107 or environment. Radar signal sensing may be employed for automotive radar, e.g., detecting an environment around a vehicle, nearby vehicles or items, detecting information for smart cruise control, collision avoidance, etc. Radar signal sensing may be employed for gesture recognition, e.g., a human activity recognition, a hand motion recognition, a facial expression recognition, a keystroke detection, sign language detection, etc. Radar signal sensing may be employed to acquire contextual information, e.g., location detection, tracking, determining directions, range estimation, etc. Radar signal sensing may be employed to image an environment, e.g., to provide a 3-dimensional (3D) map for virtual reality (VR) applications. Radar signal sensing may be employed to provide high resolution localization, e.g., for industrial Internet-of-things (IIoT) applications. In some examples, the radar device 103 may provide consumer level radar with advanced detection capabilities. Radar signal sensing may provide touchless or device free interaction with a device or system. For example, a wireless device may detect user gestures to trigger an operation at the wireless device.

In some examples, radar signal sensing may be based on frequency ranges that overlap with wireless communication systems for the signal 105, such as the wireless communication system illustrated in FIG. 1. The radar device 103 may use a waveform for the signal 105 that relates to a communication system. As one non-limiting example, radar signal sensing may be performed via a mmW signal, such as a Frequency Range2 (FR2), Frequency Range 2x (FR2x), and/or Frequency Range 4 (FR4) signal, which may provide improved range for radar signal detection. In some examples, the radar device 103 may be capable of performing radar signal sensing and wireless communication. In some examples, the radar device 103 may correspond to a UE 104, a base station 102 or 180, or other access point in the communication system of FIG. 1. In other examples, the radar device 103 may perform radar signal sensing without having wireless communication capabilities. As illustrated in FIG. 1, the radar device 103 may use beams to transmit the signal 105. The radar device 103 may be within or outside of a coverage area 110 of a base station 102 or 180.

The wireless communications system illustrated in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
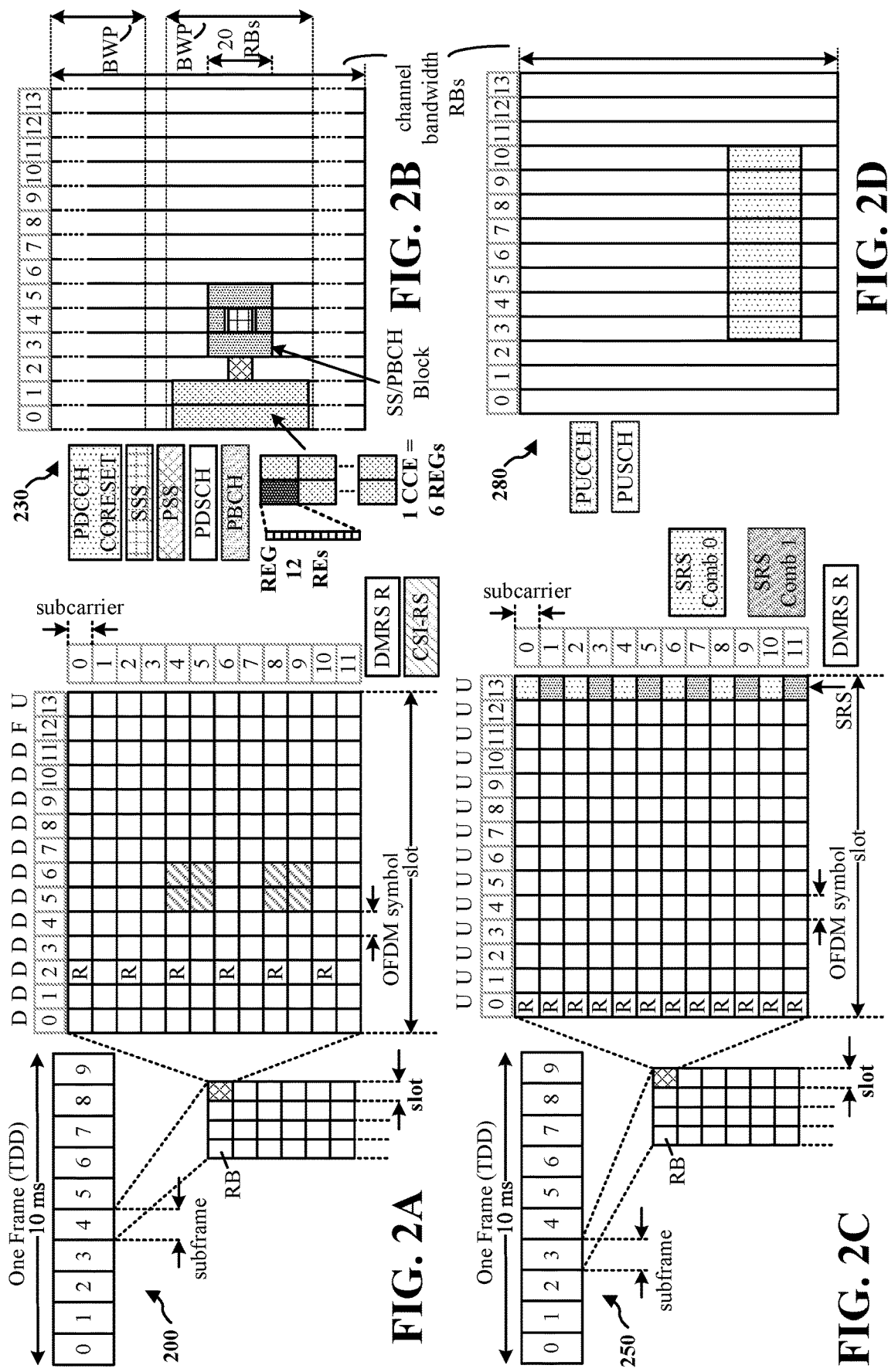
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
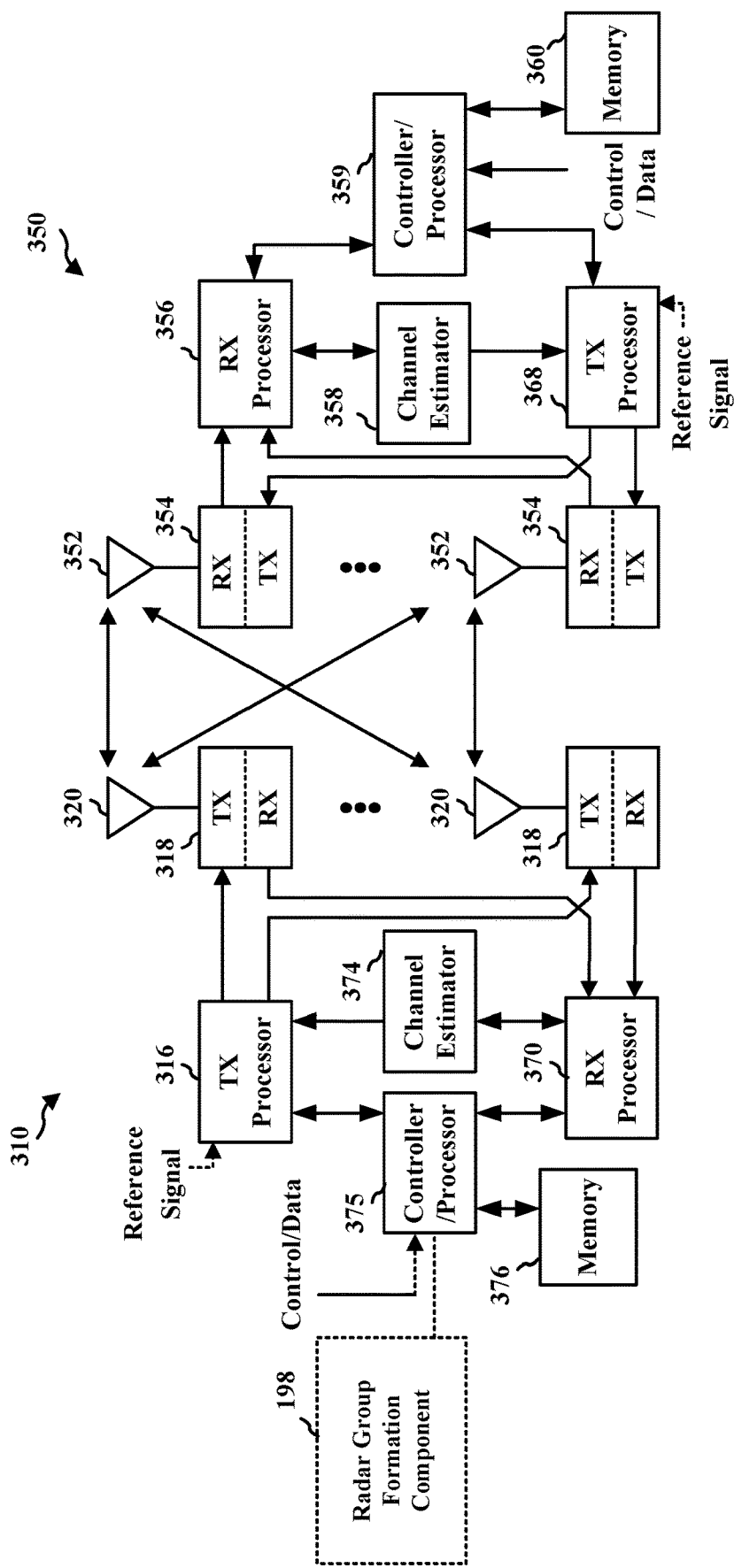
FIG. 3 is a diagram illustrating an example of a wireless device capable of sensing a radar signal.

FIG. 3 is a block diagram of a first wireless device 310 having components for wireless transmission. The wireless device 310 may be a radar device configured to perform the aspects presented herein. In some examples, the wireless device 310 may be capable of communication with another wireless device 350, e.g., based on sidelink and/or an access link, such as described in connection with FIG. 1. The wireless device 310 may include one or more antennas 320 may include a transmitter/receiver 318 with a corresponding transmit processor 316 and receive processor 370 that are configured to perform radar transmission and measurement, such as described in connection with FIGS. 4-5. The one or more antenna 320, transmitter/receiver 318, transmit processor 316, and receive processor 370 may transmit a radar signal and receive reflections of the radar signal. The controller/processor 375 may determine radio frequency (RF) sensing information about a target based on the received signal.

In some examples, the wireless device 310 may be capable of wireless communication in addition to RF sensing. For communication, packets may be provided to a controller/processor 375. The controller/processor 375 implements layer 3 and layer 2 functionality. The transmit (TX) processor 316 and the receive (RX) processor 370 implement layer 1 functionality associated with various signal processing functions. Different spatial streams may be provided to a different antenna 320 via a separate transmitter 318 TX. Each transmitter 318 TX may modulate an RF carrier with a respective spatial stream for transmission.

At the wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single stream, such as an OFDM symbol stream. The RX processor 356 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions may then be decoded and deinterleaved to recover the data and control signals that were originally transmitted by the wireless device 310 on the physical channel. The data and control signals may then be provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations.

Channel estimates derived by a channel estimator 358 from a reference signal or feedback transmitted by the wireless device may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The received transmission may be processed at the wireless device 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover packets from the wireless device 350. The controller/processor 375 may also be responsible for error detection using an ACK and/or NACK protocol to support HARQ operations.

At least one of the TX processor 316, the RX processor 370, or the controller/processor 375 may be configured to perform aspects in connection with the radar group formation component 198 of FIG. 1 to perform radar group formation and/or transmission techniques.

Figure 4:
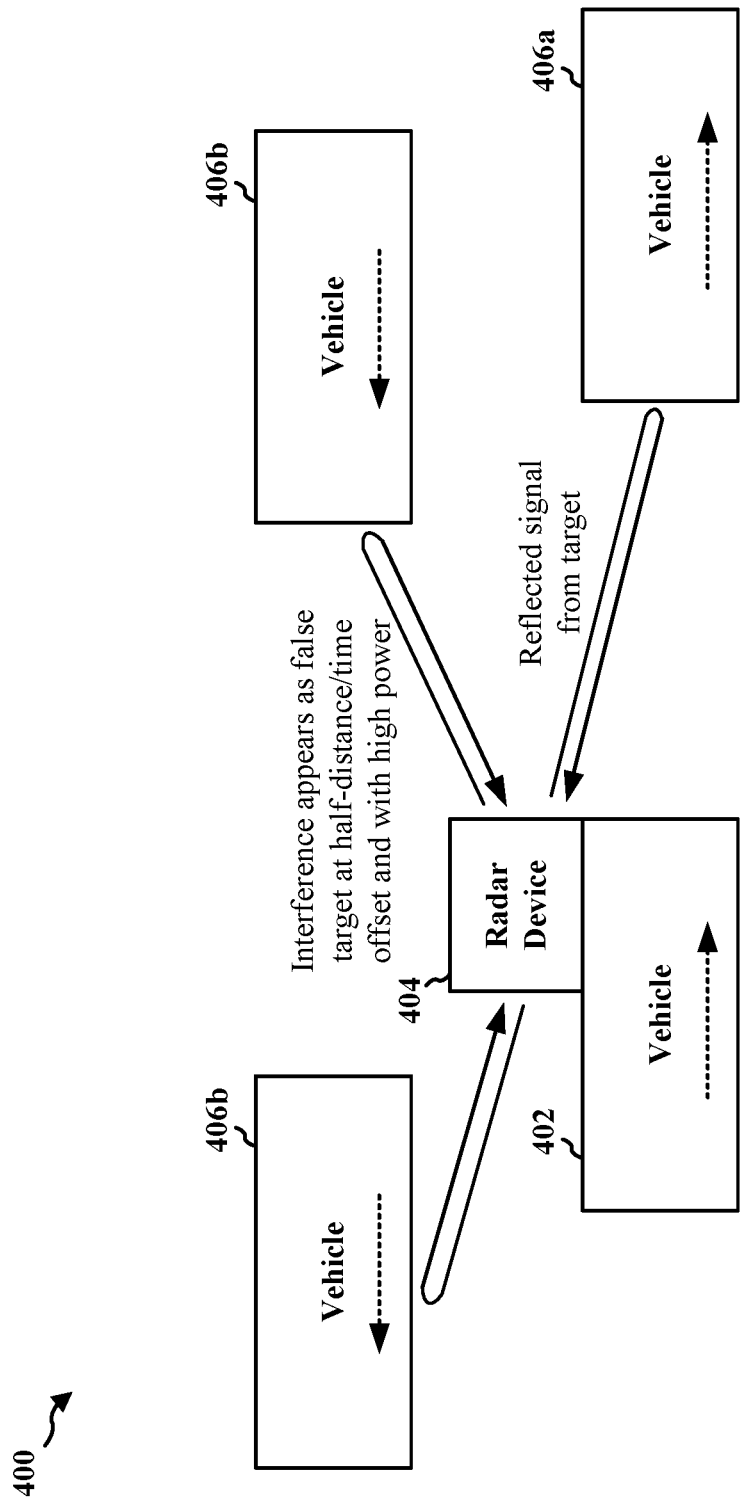
FIG. 4 is a diagram illustrating radar signals transmitted by a vehicle and reflected from a target and a false target.

FIG. 4 is a diagram 400 illustrating radar signals transmitted by a vehicle 402 and reflected from a target 406a and a false targets 406b. A ranging radar may be incorporated in the vehicle 402 for performing collision avoidance and other related techniques. Although FIG. 4 illustrates an example of a radar application for a vehicle, the aspects described in connection with FIG. 4 are similarly applicable to non-vehicular radar devices. A radar device 404 at the vehicle 402 may be configured to transmit a radar signal/pulse and receive a return signal based on a reflection of the radar signal from an object, which may be referred to as a target (e.g., the target 406a). The radar device 404 at the vehicle 402 may measure a time delay between transmission of the radar signal and reception of the return signal for determining a distance to the object from which the return signal was reflected. In some cases, a false target 406b may be detected based on an interfering radar signal from another radar device. The other radar device may be associated with a different vehicle (e.g., the false targets 406b). For example, the radar signal from the radar device 404 may be reflected from one or more of the false targets 406b and received by the radar device 404 at the vehicle 402 based on a shortened distance/time offset and with higher power. If the radar device 404 at the vehicle 402 is not able to distinguish the signal from the radar reflections of its own radar signal, the vehicle 402 may misinterpret the received signal an incorrectly measure the distance to the target 406a. The vehicle 402 may determine the presence of a false target 406b at an incorrect location based on the signal.

As a number of vehicles equipped with sensing devices, such as ranging radars, increases in a given area, the sensing devices may increasingly interfere with each other, as there may be no or little coordination among the sensing devices/radars. That is, other vehicles (e.g., the false targets 406b) may transmit radar signals independently of conditions associated with the radar device 404 of the vehicle 402. Therefore, the signal received by the radar device 404 of the vehicle 402 may include the return signal from the radar of the vehicle 402 or a different signal (e.g., interference) transmitted from a radar of the other vehicles (e.g., false targets 406b). Accordingly, multiple radar sources operating in proximity to each other may cause significant interference to other radars of the multiple radar sources. As certain radar waveforms, such as FMCW, received by the radar device 404 of the vehicle 402 may be signature-less, the radar return signal may be indistinguishable from the different radar signals transmitted from the multiple radar sources.

Figure 5:
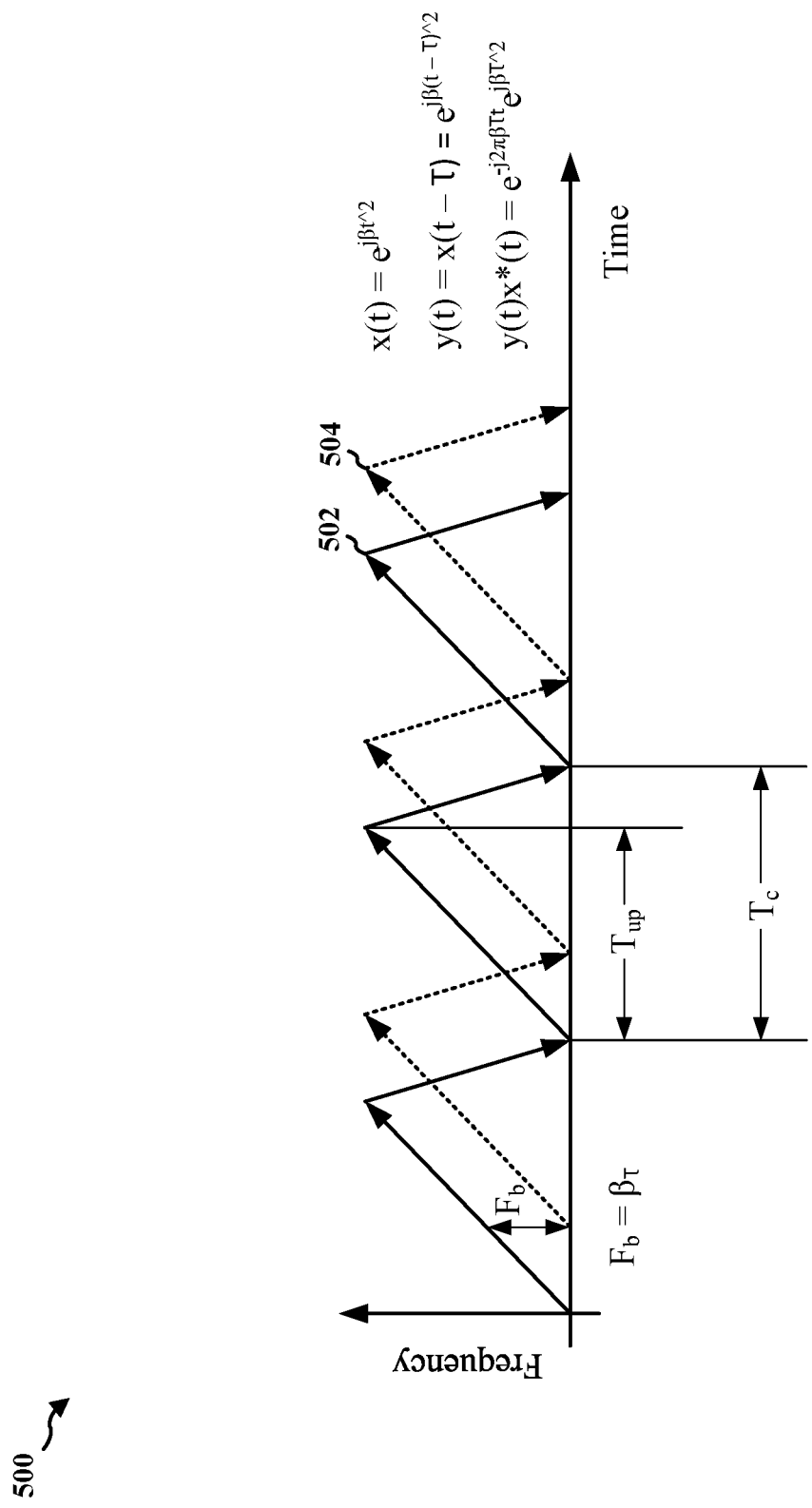
FIG. 5 is a diagram illustrating a transmitted signal and a return signal of a radar.

FIG. 5 is a diagram 500 that illustrates a transmitted signal 502 and a return signal 504 of a radar. The signals 502-504 may be associated with an FMCW waveform utilized by the radar for frequency sweeping. The transmitted signal 502 may correspond to an instantaneous frequency that increases from zero to a higher frequency and subsequently decreases from the higher frequency to zero based on a sinusoidal operation. Each sweep up and down may correspond to an individual pulse or chirp of the FMCW. A chirp time may be indicated by $T_c$ and a sweeping up time may be indicated by $T_{up}$. For instance, the frequency may sweep up from 77 GHz to 78 GHz to provide a sweeping bandwidth of 1 GHz. A time period that elapses for the sweeping up of the 1 GHz of bandwidth may correspond to $T_{up}$. After the radar sweeps up to 78 GHz, an additional/non-zero length of time may elapse for the radar to sweep down and return to 77 GHz. The additional/non-zero length of time may correspond to $T_{down}$. Thus, $T_{up}+T_{down}$ may equal $T_c$ (e.g., the duration of the chirp/pulse). In examples, the radar may be configured based on certain $T_c$ parameters.

The radar may receive a series of chirps via the return signal 504 that match the transmitted signal 502, albeit delayed based on a location of an object from which the return signal is reflected. As a distance between the radar and the object increases, the corresponding delay may become larger. The distance to the object may be determined based on determining the delay. For example, rather than directly measuring a time of the delay, a frequency delta between the transmitted signal 502 and the return signal 504 may be determined, where the frequency delta may be proportional to the delay. The range of the object may be further determined based on the delay being proportional to the range. The frequency delta may be associated with a range spectrum and a beat frequency ($F_b$) determined based on a Fast Fourier Transform (FFT). The beat frequency may correspond to a mixed output of the transmitted signal 502 and the return signal 504. A slope for sweeping up the frequency may be defined (e.g., 1 GHz per $T_{up}$ seconds), such that a rate at which the slope changes may correspond to a beta ($\beta$) parameter.

The parameters of the transmitted signal 502 and the return signal 504 may be indicative of a maximum (e.g., theoretical) detectable range of an FMCW receiver of the radar. For longer range radars, 100-300 m may be the maximum detectable range. The parameters may also be indicative of a maximum detectable speed/velocity (e.g., 30-40 m/s). For example, based on multiple received chirps, the velocity of the object may be determined based on a Doppler spectrum and a direction of the object may be determined based on a direction of arrival (DoA) spectrum. In examples, outputs such as $x(t)=e^{j\beta t^{\wedge}2}$; $y(t)=x(t-\tau)=e^{j\beta(t-\tau)^{\wedge}2}$; and/or $y(t)x^*(t)=e^{-j2\pi\beta\tau t}e^{j\beta\tau^{\wedge}2}$ may be determined based on the parameters of the FMCW waveform, where x corresponds to a transmitted chirp signal, y corresponds to a received chirp signal, t corresponds to time, j corresponds to $\sqrt{-1}$, and $\tau$ corresponds to a delay between a transmitted chirp and a received chirp. That is, three different frequency analyses may be performed to determine range, velocity, and/or direction.

FIGS. 6A-6B illustrate range spectrum diagrams 600-650. If transmitted signals of a radar and an interferer (e.g., a radar component associated with the vehicle 202 and the separate radar device 204) sweep the frequency in a same direction, interference received by the radar may cause a false peak (e.g., "ghost target") to be indicated on the range spectrum. For example, a target may be indicated as a peak on the diagram 600 based on a received signal reflected from the target. However, because an interferer signal may be indistinguishable from a signal of the intended target, the peak may correspond to the interferer/false target.

If transmitted signals of the radar and the interferer sweep the frequency in an opposite direction, interference received by the radar may cause wideband noise to be indicated on the range spectrum. For example, the interferer may utilize different chirps, such as for sweeping down the frequency while the radar is sweeping up the frequency in an opposite sweeping direction. In such cases, the interferer may be indicated as wideband noise, as illustrated in the diagram 650. Regardless of whether the interference is indicated as a peak or as wideband noise, the interference may be severe enough that the intended target may not be detectable. For instance, a level of wideband noise may correspond to −85 dB, while the intended target may correspond to a lower dB level, such as −100 dB.

The radar may transmit a series of pulses into an environment for which the radar may already have information indicative of intended targets and/or clutter located in a field of view (FOV) of the radar. For example, the radar may have such information for performing tracking operations. By identifying the false peaks and/or measuring the noise level, the radar may determine a portion of the received power that is not associated with a return signal of the radar and the congestion level may be determined based on the portion of the received power that is not associated with the return signal of the radar. Additionally, or alternatively, the radar may pause operations and "listen" for signals from other radar signal transmitters. Radar signals received (e.g., from the other radar signal transmitters) during the paused operations of the radar may be indicative of the congestion level.

Figure 7:
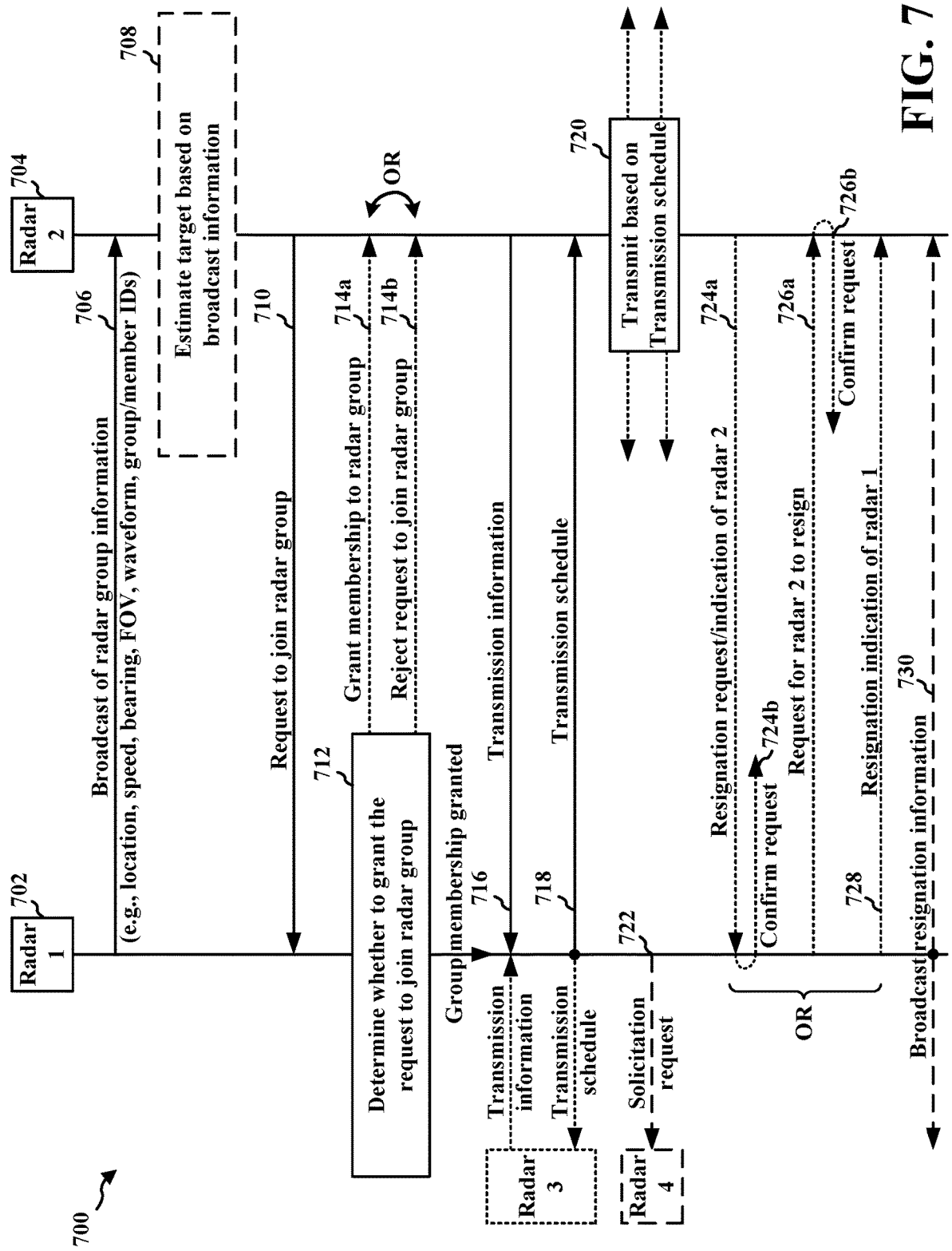
FIG. 7 is a call flow diagram illustrating sidelink communications between a first radar and a second radar.
Figure 8:
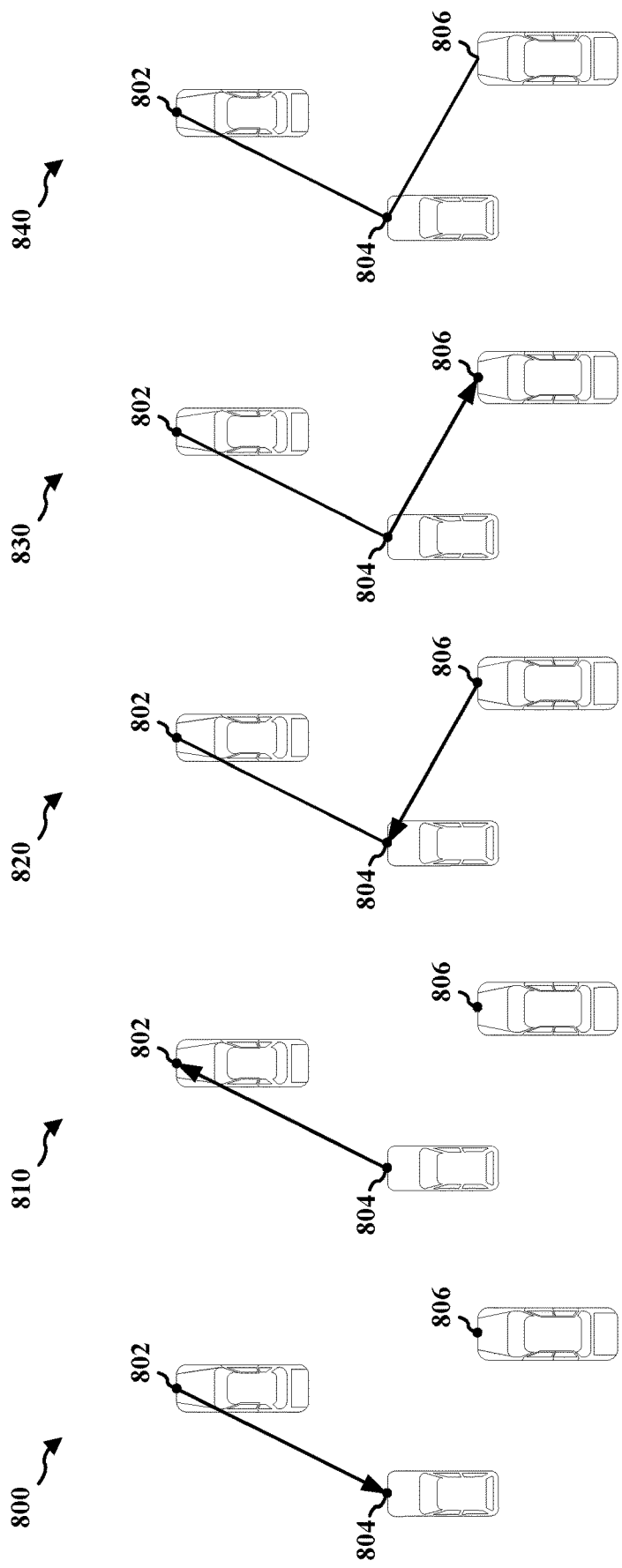
FIGS. 8A-8E illustrate diagrams of radar group formation.

FIG. 7 is a call flow diagram 700 illustrating communications between a first radar 702 (e.g., radar 1) and a second radar 704 (e.g., radar 2). At 706, the first radar 702 may transmit a broadcast of radar group information, which may be received by one or more radar devices, such as the second radar 704, that may not be currently included in the group of the first radar 702. In aspects, the broadcast received, at 706, by the second radar 704 may be one broadcast of a plurality of broadcasts received by the second radar 704 and transmitted from a plurality of different radar devices. The radar group information broadcast, at 706, may be indicative of parameters such as location, speed, bearing, FOV, waveform, group identifier (ID), member ID, etc., of one or more radars included in the group of the first radar 702. The second radar 704 may estimate, at 708, a target based on the broadcast information received, at 706, from the first radar 702.

At 710, the second radar 704 may transmit a request to the first radar 702 to join the radar group of the first radar 702. The request transmitted, at 710, may be based on selecting the group of the first radar 702 based on the broadcast of the radar group information over other broadcasts of the plurality of different radar devices. At 712, the first radar 702 may determine whether to grant the request of the second radar 704 to join the radar group of the first radar 702 (e.g., based on parameters such as location of the second radar 704 with respect to the radar group members). In examples, the first radar 702 may transmit, at 714a, to the second radar 704, a grant of membership to the radar group of the first radar 702. In other examples, the first radar 702 may alternatively transmit, at 714b, a rejection to the request of the second radar 704 to join the radar group of the first radar 702.

If group membership is granted to the second radar 704, the first radar 702 may receive, at 716, transmission information from one or more radar group members. For example, the first radar 702 may receive, at 716, transmission from the second radar 704 indicative of transmission parameters of the second radar 704 and/or the first radar 702 may receive, at 716, transmission information from a third radar (e.g., radar 3) indicative of transmission parameters of the third radar. At 718, the first radar 702 may transmit a transmission schedule to the one or more radar group members. For example, the first radar 702 may transmit, at 718, the transmission schedule to the second radar 704 and/or the first radar 702 may transmit, at 718, the transmission schedule to the third radar. Radar group members such as the second radar 704 may transmit, at 720, radar pulses/signals based on the transmission schedule.

At 722, the first radar 702 may transmit a solicitation request to a radar (e.g., radar 4) that is outside the radar group of the first radar 702. In aspects, the outside radar may be included in a different group from the group of the first radar 702 when the solicitation request is transmitted, at 722, to the outside radar. The first radar 702 may transmit, at 722, the solicitation request to the outside radar based on parameters such as the outside radar being positioned in an improved location for communicating with the radar group members of the group of the first radar 702. The outside radar may determine to accept or rejection the solicitation request of the first radar 702.

At 724a, the second radar 704 may transmit a resignation request to the first radar 702 to resign from the group of the first radar 702. The resignation request may be confirmed, at 724b, by the first radar 702 or the resignation request may be rejected by the first radar 702. Alternatively, the second radar 704 may transmit, at 724a, an indication to the first radar 702 that the second radar 704 is going to be resigning from the group of the first radar 702. The first radar 702 may also alternatively transmit, at 726a, a request to the second radar 704 to resign from the group of the first radar 702, which may be confirmed, at 726b, by the second radar 704. In some examples, the second radar 704 may reject the request for the second radar 704 to resign from the group of the first radar 702.

Additionally or alternatively, the first radar 702 may transmit, at 728, an indication to the second radar 704 that the first radar is going to be resigning from the group of the first radar 702. The resignation indication transmitted, at 728, may cause the group of the first radar 702 to be dismissed or the resignation indication transmitted, at 728, may cause the role of group leader to be transferred from the first radar 702 to another group member, such as the second radar 704. At 730, the first radar 702 may broadcast the resignation information (e.g., received/transmitted at 724a, 726a, and/or 728) to the second radar 704 and/or the other group members included in the group of the first radar 702.

While the first radar 702 may not be configured to determine an identity of the second radar 704 based on a waveform of the second radar 704, the radars 702-704 may be configured to communicate with each other based on sidelink communications. For example, the radars 702-704 may communicate timing parameters and FMCW waveform parameters. The radars 702-704 may also perform target detection and range estimation without actively transmitting a pulse. For example, the first radar 702 may utilize a transmission of the second radar 704 for target detection. Such cooperative radar sensing may be based on the second radar 704 transmitting a pulse and the first radar 702 performing a reception of the pulse. By receiving a pulse transmitted from the second radar 704, the first radar 702 may perform operations such as range estimation, direction estimation, Doppler estimation, etc. However, cooperative radar sensing may be based on the radars 702-704 being configured to communicate with each other via sidelink. A communication capability of the radars 702-704 may be used to reduce interference between the radars 702-704 (e.g., in crowded environments) and perform other coordinated operations among the radars 702-704.

Based on communications of the radars 702-704 through sidelink, a time of a global clock of each radar may be indicated by the radars 702-704 to synchronize the timing of the radars 702-704. The communications may allow a clock offset among the radars 702-704 to be adjusted. The adjustments may be performed based on a global positioning system (GPS) or synchronized vehicle-to-everything (V2X) channels. A location of each radar may be indicated through sidelink based on a GPS measurement or a positioning function indicated via V2X. Thus, the first radar 702 may determine a location of the second radar 704 with increased accuracy based on radar tracking techniques. Radar ranging data may be further utilized by the radars 702-704 to increase the accuracy of radar determinations.

Radars that are located physically close to each other may have an increased likelihood of interfering with each other. To reduce or eliminate the interference, such radars may be grouped together based on dynamic group formation techniques. After the radars 702-704 are grouped, transmissions of the grouped radars may be coordinated among the grouped radars to decrease interference. Each group may be centrally coordinated through a lead/head radar that may manage group membership and group transmission. For example, the group leader may generate a transmission schedule for members of the group to follow.

The radars 702-704 of the group may exchange information associated with radar detection and/or estimation procedures. Each member of the group may determine when a transmission of another member of the group is scheduled to occur based on the transmission scheduled generated/indicted by the group leader. Each member of the group may also determine which member of the group will be performing the transmission based on the transmission schedule and where the member of the group is located. Accordingly, false targets may be predictable by the radars 702-704 cause reduced impairment to radar estimations and target detections.

In order to form a group of multiple radars, each radar may be initially regarded as a group of one radar, where the radar (e.g., the first radar 702) may be the leader/head of the single-radar group. The group leader of a multi-radar group may periodically broadcast (e.g., to group members such as the second radar 704) information indicative of location, speed, bearing, FOV, waveform, IDs of each group members, a group ID, etc., through a sidelink channel. If an outside radar to the group receives the broadcast from the group leader, the outside radar may determine to join the group. Since the broadcast may include location information, the outside radar may determine whether the outside radar is located physically close to the group when determining whether to join the group. If multiple broadcasts are received, the outside radar may determine which group to join or whether to refrain from joining any of the detected groups. If the outside radar determines to join a group, the outside radar may send a request to the group leader to join the determined group. The request may or may not be granted by the group leader. If the request is rejected, the outside radar determine to send a second request to join a different group. Upon receiving the request, the group leader of the different group may respond to the outside radar with a confirmation or a rejection. The determination to accept or reject the request may be based on whether the request is received from a radar within a threshold proximity to other group members, whether a size of the group is currently small enough to add another group member, etc. The determination by the group leader to grant membership to the outside radar may optionally include conveying the role of group leader to the newly joined member radar (e.g., the newly joined member radar may be located at an improved location for communicating with the other group members).

In order to leave the group, the radar 704 may transmit a resignation request to the group leader (e.g., the first radar 702). For example, if the second radar 704 is located on a vehicle and determines that the vehicle is about to make a turn that will cause the second radar 704 to become geographically distant from the group, the second radar 704 may transmit the resignation request for leaving the group. The group leader may respond with a confirmation message. If the group leader determines to leave the group, a notification may be broadcast to the group indicating a different radar that is to assume the role of group leader. Alternatively, the group may be dismissed and each group member may revert to being a single-radar group and/or search for another group to join.

The group leader may maintain the group by monitoring locations of the group members. If a group member becomes geographically distant, the group leader may transmit a request to the geographically distant radar for the geographically distant radar to resign from the group. The group leader may optionally transmit solicitation requests to geographically proximate radars of other groups to join the group of the group leader. Monitoring the locations of the group members may be performed through radar measurements and sidelink communications.

FIGS. 8A-8E illustrate diagrams 800-840 for radar group formation. After a group is formed, transmissions of the group may be based on the transmission schedule generated/indicated by the group leader. The group leader may determine a location of each group member in order to generate the transmission schedule. In the diagrams 800-840, radars may be operatively connected to each of three vehicles, which may be geographically proximate to each other. Initially, each of the three radars included on the three vehicles may correspond to three separate single-radar groups.

In the diagram 800, a first radar 802 may transmit a request to a second radar 804 to join the group of the second radar 804. In the diagram 810, the second radar 804 may transmit a grant to the request of the first radar 802, as the second radar 804 may be a leader of a single-radar group that includes the second radar 804. Based on the grant from the second radar 804, the first radar 802 and the second radar 804 may form a multi-radar group with the second radar 804 being the group leader of the multi-radar group. In the diagram 820, a third radar 806 may transmit a request to the second radar 804 (e.g., upon receiving a broadcast from the group leader/second radar 804 of the multi-radar group). That is, the third radar 806 may determine, based on the broadcast from the second radar 804, to join the multi-radar group that includes the first radar 802 and the second radar 804. The third radar 806 may transmit the request to the group leader/second radar 804 of the multi-radar group. In the diagram 830, the group leader/second radar 804 may respond to the request of the third radar 806 by granting group membership to the third radar 806. In aspects, the second radar 804 may convey the role of group leader to the third radar 806. In the diagram 840, the multi-radar group may include the first radar 802, the second radar 804, and the third radar 806.

The formation of radar groups may allow false peaks, if any, caused by radar transmissions of the radar group to become more predictable. The group leader may generate the transmission schedule based on slots that are separated by a predetermined length of time. When the time is slotted, transmission of radar frames may be based on slot boundaries. The slot may be configured such that transmission timing may be determined by the group members. Thus, a delay $f_b$ may be predictable, which may thereby cause a location of a false peak to be predictable. In cases where the false peak is predictable, the group leader may attempt to position the false peak such that a real target (e.g., peak) may not be overlapped with the false peak. A length of the slot may also be determined by the group leader, which may be further determined based on the location of group members. The length of the slot may be long enough that by the time a next slot boundary occurs, an impact of the previous transmission may have faded, so that transmissions that are geographically proximate to each other may not interfere with each other.

The group leader may broadcast information such as member location, speed, bearing, transmission schedule, etc., every N slots. Thus, group members may follow the transmission schedule for the next N slots upon receiving the schedule broadcast by the group leader. Based on the broadcast location, speed, and bearing of the other group members, a radar may predict where a false peak may occur. In aspects, the group members may estimate a target range/Doppler and direction based on the broadcast information without performing a physical transmission. That is, the group members may utilize the transmissions of the other group members to detect targets based on estimations of velocity, location, direction, etc.

Figure 9:
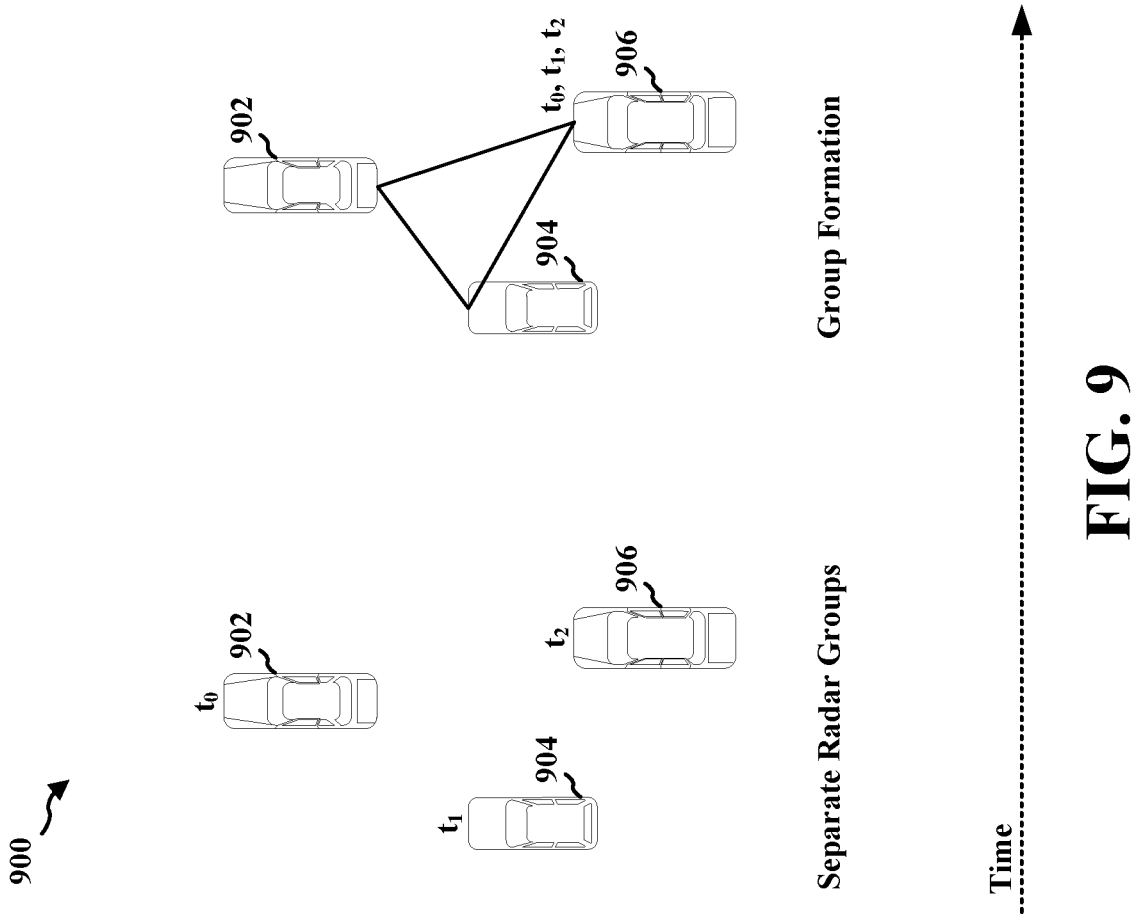
FIG. 9 illustrates a diagram of a radar group that transmits radar pulses based on a transmission schedule.

FIG. 9 illustrates a diagram 900 of a radar group that transmits radar pulses based on a transmission schedule (e.g., $t_0$, $t_1$, $t_2$) determined after group formation. More specifically, a group leader 906 may determine the transmission schedule based on the group formation. The transmission schedule may be broadcast to the group members, such as a first group member 902 and a second group member 904. A transmission of the first group member may correspond to a first slot boundary $t_0$, a transmission of the second group member may correspond to a second slot boundary $t_1$, and a transmission of the group leader may correspond to a third slot boundary $t_2$. Since the group members 902-904 including the group leader 906 may follow the transmission schedule and determine the location, speed, and bearing of each radar in the group, errors caused by false peaks may be reduced given that locations of the false peaks may be predictable.

The radars may coordinate through sidelink to form a slot-based schedule based on centralized techniques. Thus, a number of "blind" transmissions in a transmission environment may be reduced, which may thereby reduce interference. Each transmission schedule generated by the group leader 906 may be determined locally based on aspects of the group. Radars with corresponding bearings and FOVs may determine to join the group. Additional slot-based transmissions may be allocated to certain radars within the radar group based on information about the certain radars, such as location. A radar that is determined to be positioned in an improved location with respect to the other group members may have more slots allocated thereto. Parameters such as group size and radar density/congestion may also be considered for forming the group. For example, a larger group may be formed in a crowded environment to utilize transmissions of many other group members and reduce interference/congestion.

Figure 10:
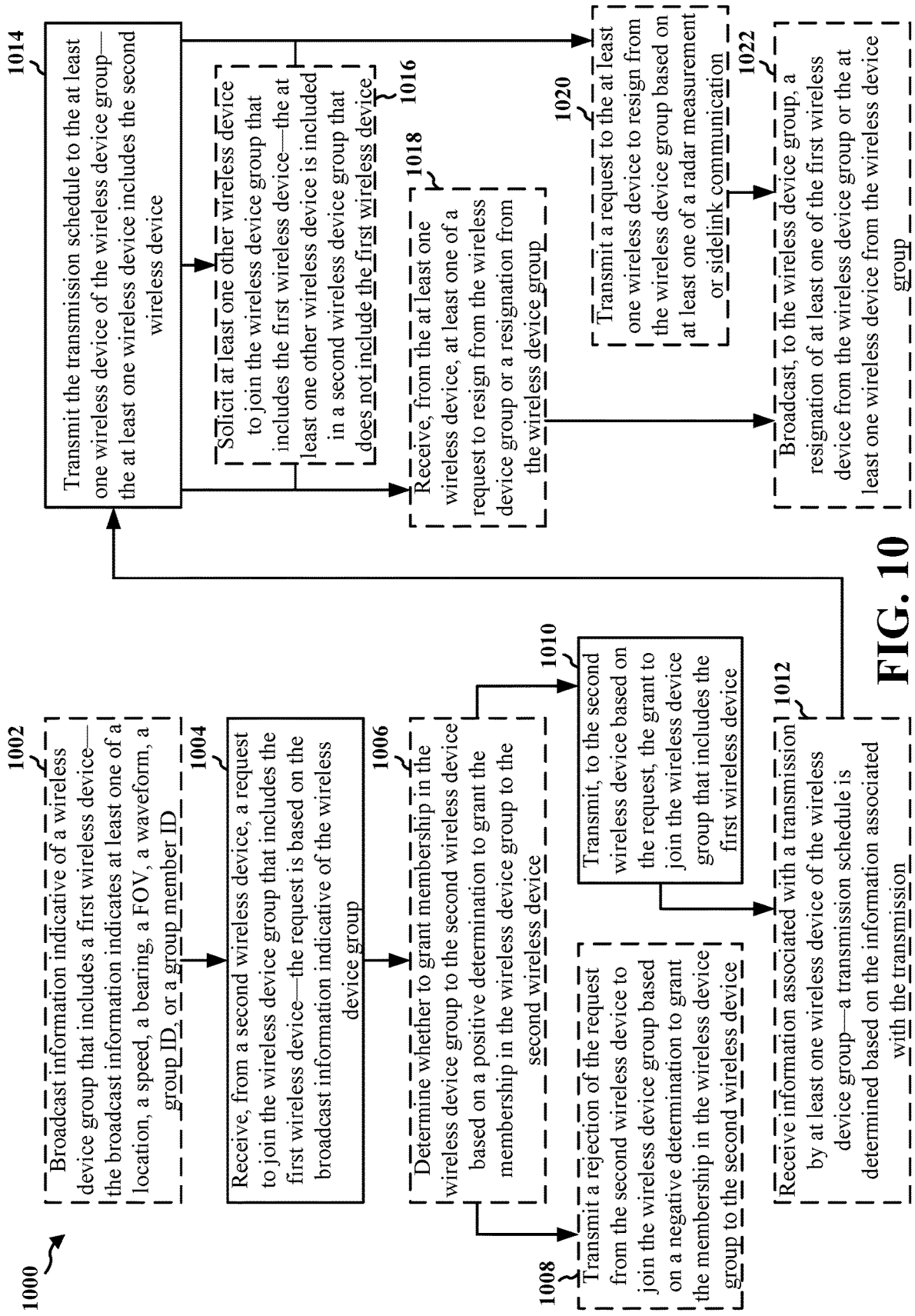
FIG. 10 is a flowchart of a method of wireless communication at a first wireless device.

FIG. 10 is a flowchart 1000 of a method of wireless communication at a first wireless device. The wireless device may be the radar device 103, 404, 702, 804, 906; the vehicle 402; and/or an apparatus 1202 (e.g., a vehicular radar or a non-vehicular radar). The method may be performed to provide a radar group formation and/or a radar group transmission schedule. Optional aspects are illustrated with a dashed line.

At 1002, the first wireless device may broadcast information indicative of a wireless device group that includes a first wireless device—the broadcast information indicate s at least one of a location, a speed, a bearing, a FOV, a waveform, a group ID, or a group member ID. For example, referring to FIG. 7, the first radar 702 may broadcast, at 706, radar group information. The radar group information broadcast, at 706, may be indicative of location, speed, bearing, FOV, waveform, group/member IDs, etc. The broadcasting may be performed, e.g., by the broadcaster component 1240 of the apparatus 1202 in FIG. 12.

At 1004, the first wireless device may receive, from a second wireless device, a request to join the wireless device group that includes the first wireless device—the request is based on the broadcast information indicative of the wireless device group. For example, referring to FIGS. 7 and 8A, the first radar 702 may receive, at 710, from the second radar 704, a request to join the radar group of the first radar 702. The request received, at 710, from the second radar 704 may be based on the radar group information broadcast, at 706, to the second radar 704. The reception may be performed, e.g., by the reception component 1230 of the apparatus 1202 in FIG. 12.

At 1006, the first wireless device may determine whether to grant membership in the wireless device group to the second wireless device based on a positive determination to grant the membership in the wireless device group to the second wireless device. For example, referring to FIG. 7, the first radar 702 may determine, at 712, whether to grant the request to join the radar group of the first radar 702. A grant of membership to the radar group may be transmitted, at 714a, to the second radar 704, if the first radar 702 authorizes the request from the second radar 704 to join the radar group of the first radar 702. The determination may be performed, e.g., by the determination component 1242 of the apparatus 1202 in FIG. 12.

At 1008, if the first wireless device determines not to grant membership to the second wireless device, the first wireless device may transmit a rejection of the request from the second wireless device to join the wireless device group based on a negative determination to grant the membership in the wireless device group to the second wireless device. For example, referring to FIG. 7, the first radar 702 may transmit, at 714b, a rejection to the request from the second radar 704 to join the radar group of the first radar 702. The rejection to the request may be transmitted, at 714b, to the second radar 704, based on a determination of the first radar 702 to not extend group membership to the second radar 704. The transmission may be performed, e.g., by the transmission component 1234 of the apparatus 1202 in FIG. 12.

At 1010, if the first wireless device determines to grant membership to the second wireless device, the first wireless device may transmit, to the second wireless device based on the request, the grant to join the wireless device group that includes the first wireless device. For example, referring to FIG. 7, the first radar 702 may transmit, at 714a, to the second radar 704, the grant of membership to join the radar group of the first radar 702. In aspects, the grant to join the wireless device group (e.g., transmitted at 714a) may cause a group leader position of the wireless device group to be transferred from the first wireless device (e.g., first radar 702) to the second wireless device (e.g., second radar 704). The transmission may be performed, e.g., by the transmission component 1234 of the apparatus 1202 in FIG. 12.

At 1012, the first wireless device may receive information associated with a transmission by at least one wireless device of the wireless device group—a transmission schedule is determined based on the information associated with the transmission. For example, referring to FIG. 7, the first radar 702 may receive transmission information, at 716, from one or more radar group members and utilize the transmission information to generate and transmit, at 718, a transmission schedule to the one or more radar group members. The reception may be performed, e.g., by the reception component 1230 of the apparatus 1202 in FIG. 12.

At 1014, the first wireless device may transmit the transmission schedule to the at least one wireless device of the wireless device group—the at least one wireless device includes the second wireless device. For example, referring to FIG. 7, the first radar 702 may transmit, at 718, the transmission schedule to one or more radar group members (e.g., radar 2, radar 3, etc.). In aspects, the one or more radar group members may or may not include the second radar 704. The transmission may be performed, e.g., by the transmission component 1234 of the apparatus 1202 in FIG. 12.

At 1016, the first wireless device may solicit at least one other wireless device to join the wireless device group that includes the first wireless device—the at least one other wireless device is included in a second wireless device group that does not include the first wireless device. For example, referring to FIG. 7, the first radar 702 may transmit, at 722, a solicitation request to a radar that is outside the group of the first radar 702, such as radar 4, to join the group of the first radar 702. In aspects, radar 4 may be included in a different radar group from the group of the first radar 702 when radar 4 receives the solicitation request. The solicitation may be performed, e.g., by the solicitation component 1244 of the apparatus 1202 in FIG. 12.

At 1018, the first wireless device may receive, from the at least one wireless device, at least one of a request to resign from the wireless device group or a resignation from the wireless device group. For example, referring to FIG. 7, the first radar 702 may receive, at 724a, a resignation request or a resignation indication from the second radar 704. The reception may be performed, e.g., by the reception component 1230 of the apparatus 1202 in FIG. 12.

At 1020, the first wireless device may transmit a request to the at least one wireless device to resign from the wireless device group based on at least one of a radar measurement or sidelink communication. For example, referring to FIG. 7, the first radar 702 may transmit, at 726a, a request for the second radar 704 to resign from the radar group of the first radar 702. The transmission may be performed, e.g., by the transmission component 1234 of the apparatus 1202 in FIG. 12.

At 1022, additionally or alternatively to 1018 and/or 1020, the first wireless device may broadcast, to the wireless device group, a resignation of at least one of the first wireless device from the wireless device group or the at least one wireless device from the wireless device group. For example, referring to FIG. 7, the first radar 702 may broadcast, at 730, resignation information to one or more radar group members. The broadcast, at 730, of the resignation information may cause at least one of the wireless device group to be terminated or a group leader position of the wireless device group to be transferred from the first wireless device (e.g., first radar 702) to the at least one wireless device (e.g., second radar 704) when the broadcast, at 730, of the resignation is for the first wireless device (e.g., first radar 702). The broadcast may be performed, e.g., by the broadcaster component 1240 of the apparatus 1202 in FIG. 12.

Figure 11:
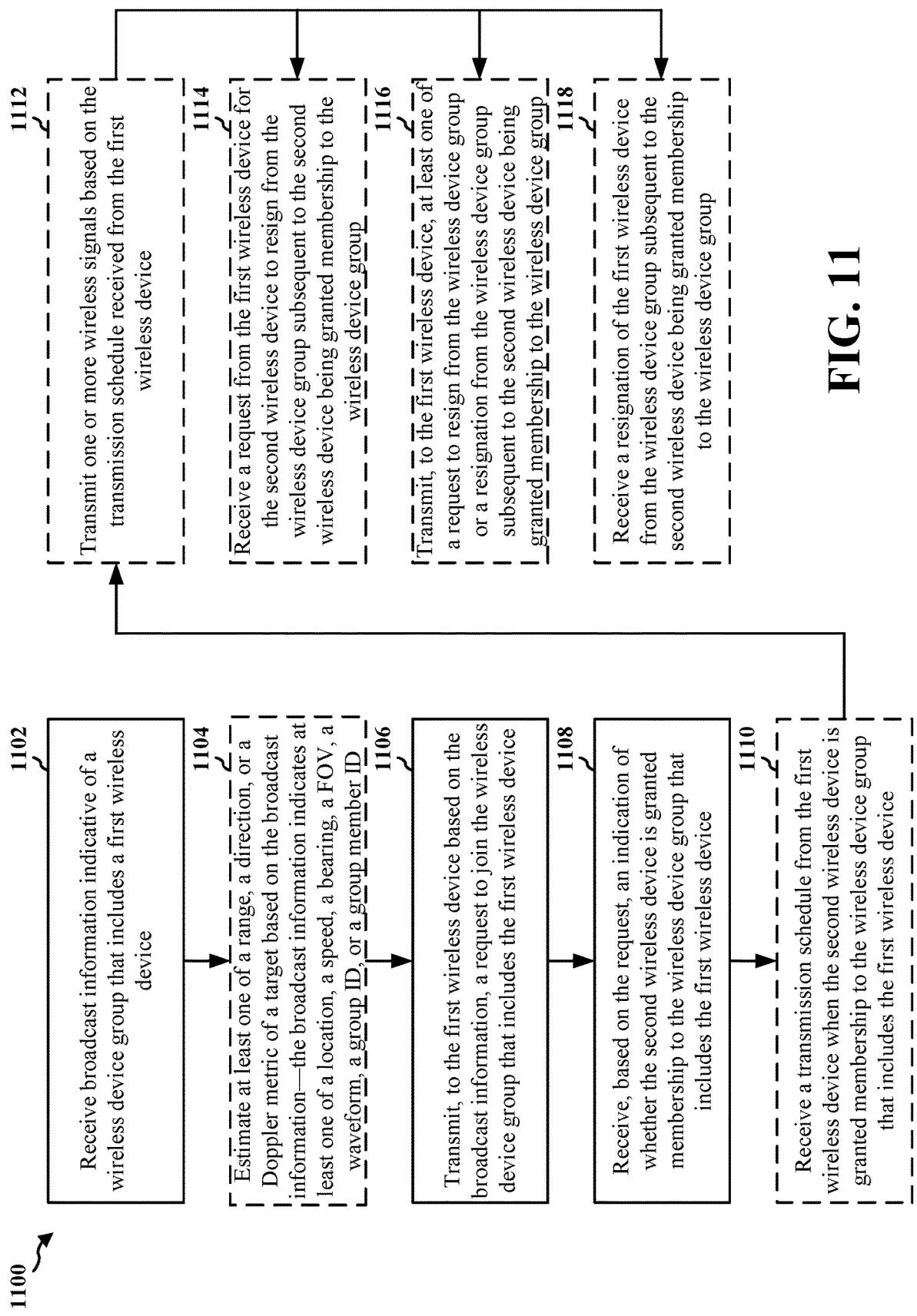
FIG. 11 is a flowchart of a method of wireless communication at a second wireless device.

FIG. 11 is a flowchart 1100 of a method of wireless communication at a second wireless device. The wireless device may be the radar device 103, 404, 704, 802, 806, 902, 904; the vehicle 402; and/or an apparatus 1302 (e.g., a vehicular radar or a non-vehicular radar). The method may be performed to provide a radar group formation and/or a radar group transmission schedule. Optional aspects are illustrated with a dashed line.

At 1102, the second wireless device may receive broadcast information indicative of a wireless device group that includes a first wireless device. For example, referring to FIG. 7, the second radar 704 may receive, at 706, a broadcast of radar group information from the first radar 702. The reception may be performed, e.g., by the reception component 1330 of the apparatus 1302 in FIG. 13.

At 1104, the second wireless device may estimate at least one of a range, a direction, or a Doppler metric of a target based on the broadcast information—the broadcast information indicates at least one of a location, a speed, a bearing, a FOV, a waveform, a group ID, or a group member ID. For example, referring to FIG. 7, the second radar may estimate, at 708, a target based on the information broadcast at 706 (e.g., location, speed, bearing, FOV, waveform, group/member IDs, etc.). The estimation may be performed, e.g., by the estimation component 1340 of the apparatus 1302 in FIG. 13.

At 1106, the second wireless device may transmit, to the first wireless device based on the broadcast information, a request to join the wireless device group that include s the first wireless device. For example, referring to FIG. 7, the second radar 704 may transmit, at 710, a request to the first radar 702 to join the radar group of the first radar 702. The broadcast, at 706, may be one of a plurality of broadcasts received by the second wireless device (e.g., second radar 704) from a plurality of wireless devices of different wireless device groups. The transmission, at 710, of the request to the first wireless device (e.g., first radar 702) may be based on a selection of the broadcast, at 706, from the plurality of broadcasts. The transmission may be performed, e.g., by the transmission component 1334 of the apparatus 1302 in FIG. 13.

At 1108, the second wireless device may receive, based on the request, an indication of whether the second wireless device is granted membership to the wireless device group that includes the first wireless device. For example, referring to FIG. 7, the second radar 704 may receive, at 714a, a grant of membership to the radar group of the first radar 702 or the second radar 704 may receive, at 714b, a rejection to the request to join the radar group of the first radar 702. That is, the indication of whether the second wireless device is granted membership to the wireless device group that includes the first wireless device may be a rejection of the request to join the wireless device group. In aspects, the second wireless device (e.g., second radar 704) may be configured as a group leader of the wireless device group when the second wireless device (e.g., second radar 704) is granted membership, at 714a, to the wireless device group that includes the first wireless device (e.g., first radar 702). The reception may be performed, e.g., by the reception component 1330 of the apparatus 1302 in FIG. 13.

At 1110, the second wireless device may receive a transmission schedule from the first wireless device when the second wireless device is granted membership to the wireless device group that includes the first wireless device. For example, referring to FIG. 7, the second radar 704 may receive, at 718, a transmission schedule from the first radar 702. The reception may be performed, e.g., by the reception component 1330 of the apparatus 1302 in FIG. 13.

At 1112, the second wireless device may transmit one or more wireless signals based on the transmission schedule received from the first wireless device. For example, referring to FIG. 7, the second radar 704 may transmit, at 720, signals (e.g., radar pulses) based on the transmission scheduled received, at 718, from the first radar 702. The transmission may be performed, e.g., by the transmission component 1334 of the apparatus 1302 in FIG. 13.

At 1114, the second wireless device may receive a request from the first wireless device for the second wireless device to resign from the wireless device group subsequent to the second wireless device being granted membership to the wireless device group. For example, referring to FIG. 7, the second radar 704 may receive, at 726a, a request from the first radar 702 for the second radar 704 to resign from the radar group of the first radar 702. The reception may be performed, e.g., by the reception component 1330 of the apparatus 1302 in FIG. 13.

At 1116, the second wireless device may (e.g., alternatively to 1114) transmit, to the first wireless device, at least one of a request to resign from the wireless device group or a resignation from the wireless device group subsequent to the second wireless device being granted membership to the wireless device group. For example, referring to FIG. 7, the second radar 704 may transmit, at 724a, a resignation request to the first radar 702 or a resignation indication to the first radar 702. The transmission may be performed, e.g., by the transmission component 1334 of the apparatus 1302 in FIG. 13.

At 1118, the second wireless device may (e.g., alternatively to 1114 and/or 1116) receive a resignation of the first wireless device from the wireless device group subsequent to the second wireless device being granted membership to the wireless device group. For example, referring to FIG. 7, the second radar 704 may receive, at 728, a resignation indication of the first radar 702 from the group of the first radar 702. The resignation received, at 728, may cause at least one of the wireless device group to be terminated or a group leader position of the wireless device group to be transferred from the first wireless device (e.g., first radar 702) to another wireless device (e.g., second radar 704) included in the wireless device group. The reception may be performed, e.g., by the reception component 1330 of the apparatus 1302 in FIG. 13.

Figure 12:
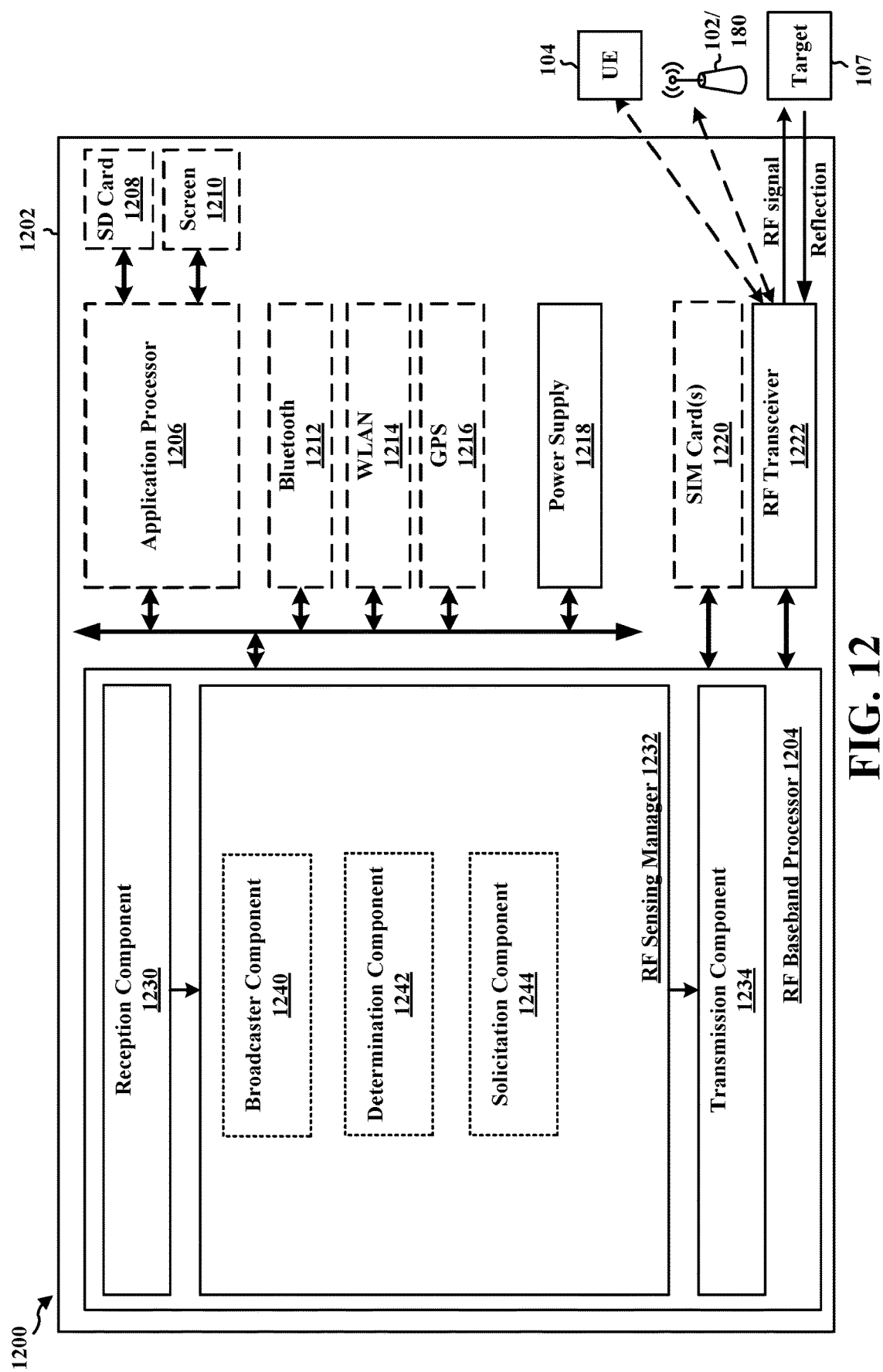
FIG. 12 is a diagram illustrating an example of a hardware implementation for an example apparatus.

FIG. 12 is a diagram 1200 illustrating an example of a hardware implementation for an apparatus 1202. The apparatus 1202 is a radar signal sensing device and includes an RF baseband processor 1204 (also referred to as a modem) coupled to an RF transceiver 1222. In some examples, the apparatus may be capable of wireless communication in addition to radar signal sensing. For example, the apparatus may be a radar device, a UE, a base station, or another access point that is capable of radar signal sensing. If the radar signal sensing device is a UE, the processor may be coupled to one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the RF transceiver 1222 with the UE 104 and/or BS 102/180. The RF baseband processor 1204 may include a computer-readable medium/memory. The computer-readable medium/memory may be non-transitory. The RF baseband processor 1204 is responsible for general processing, including the execution of software stored on the computer-readable medium/memory. The software, when executed by the RF baseband processor 1204, causes the RF baseband processor 1204 to perform the various functions described supra. The computer-readable medium/memory may also be used for storing data that is manipulated by the RF baseband processor 1204 when executing software. The RF baseband processor 1204 further includes a reception component 1230, an RF sensing manager 1232, and a transmission component 1234. The RF sensing manager 1232 includes the one or more illustrated components. The components within the RF sensing manager 1232 may be stored in the computer-readable medium/memory and/or configured as hardware within the RF baseband processor 1204. The cellular baseband processor 1204 may be a component of the wireless device 350 and may include the memory 360 and/or at least one of the TX processor 368, the RX processor 356, and the controller/processor 359. In one configuration, the apparatus 1202 may be a modem chip and include just the RF baseband processor 1204, and in another configuration, the apparatus 1202 may be the entire RF sensing device (e.g., radar device 103) and include the additional modules of the apparatus 1202.

The reception component 1230 is configured, e.g., as described in connection with 1004, 1012, and 1018, to receive, from a second wireless device, a request to join the wireless device group that includes the first wireless device—the request is based on the broadcast information indicative of the wireless device group; to receive information associated with a transmission by at least one wireless device of the wireless device group—a transmission schedule is determined based on the information associated with the transmission; and to receive, from the at least one wireless device, at least one of a request to resign from the wireless device group or a resignation from the wireless device group.

The RF sensing manager 1232 includes a broadcaster component 1240 that is configured, e.g., as described in connection with 1002 and 1022, to broadcast information indicative of a wireless device group that includes a first wireless device—the broadcast information indicates at least one of a location, a speed, a bearing, a FOV, a waveform, a group ID, or a group member ID; and to broadcast, to the wireless device group, a resignation of at least one of the first wireless device from the wireless device group or the at least one wireless device from the wireless device group. The RF sensing manager 1232 further includes a determination component 1242 that is configured, e.g., as described in connection with 1006, to determine whether to grant membership in the wireless device group to the second wireless device based on a positive determination to grant the membership in the wireless device group to the second wireless device. The RF sensing manager 1232 further includes a solicitation component 1244 that is configured, e.g., as described in connection with 1016, to solicit at least one other wireless device to join the wireless device group that includes the first wireless device—the at least one other wireless device is included in a second wireless device group that does not include the first wireless device.

The transmission component 1234 is configured, e.g., as described in connection with 1008, 1010, 1014, and 1020, to transmit a rejection of the request from the second wireless device to join the wireless device group based on a negative determination to grant the membership in the wireless device group to the second wireless device; to transmit, to the second wireless device based on the request, the grant to join the wireless device group that includes the first wireless device; to transmit the transmission schedule to the at least one wireless device of the wireless device group—the at least one wireless device includes the second wireless device; and to transmit a request to the at least one wireless device to resign from the wireless device group based on at least one of a radar measurement or sidelink communication.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the RF baseband processor 1204, includes means for receiving, from a second wireless device, a request to join a wireless device group that includes the first wireless device, the request based on broadcast information indicative of the wireless device group; means for transmitting, to the second wireless device based on the request, a grant to join the wireless device group that includes the first wireless device; and means for transmitting a transmission schedule to at least one wireless device of the wireless device group, the at least one wireless device including the second wireless device. The apparatus 1202 further includes means for broadcasting the information indicative of the wireless device group that includes the first wireless device, the broadcast information indicating at least one of a location, a speed, a bearing, a field of view, a waveform, a group ID, or a group member ID. The apparatus 1202 further includes means for determining whether to grant membership in the wireless device group to the second wireless device, the transmission of the grant to the second wireless device based on a positive determination to grant the membership in the wireless device group to the second wireless device. The apparatus 1202 further includes means for transmitting a rejection of the request from the second wireless device to join the wireless device group, the transmission of the rejection of the request based on a negative determination to grant the membership in the wireless device group to the second wireless device. The apparatus 1202 further includes means for receiving information associated with a transmission by the at least one wireless device of the wireless device group, the transmission schedule determined based on the information associated with the transmission. The apparatus 1202 further includes means for transmitting a request to the at least one wireless device to resign from the wireless device group based on at least one of a radar measurement or sidelink communication. The apparatus 1202 further includes means for receiving, from the at least one wireless device, at least one of a request to resign from the wireless device group or a resignation from the wireless device group. The apparatus 1202 further includes means for soliciting at least one other wireless device to join the wireless device group that includes the first wireless device, the at least one other wireless device included in a second wireless device group that does not include the first wireless device at a time of the solicitation. The apparatus 1202 further includes means for broadcasting, to the wireless device group, a resignation of at least one of the first wireless device from the wireless device group or the at least one wireless device from the wireless device group.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
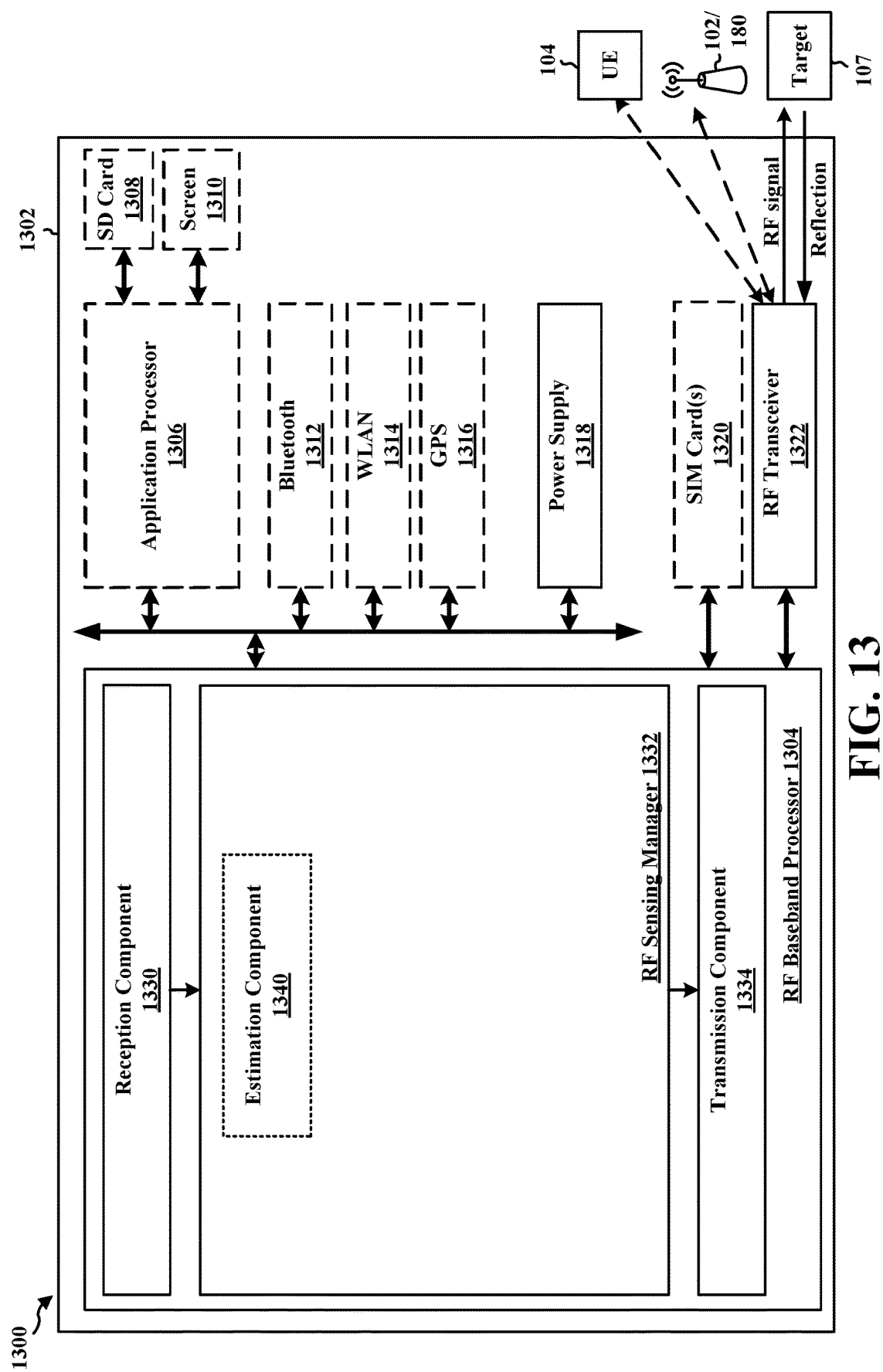
FIG. 13 is a diagram illustrating an example of a hardware implementation for an example apparatus.

FIG. 13 is a diagram 1300 illustrating an example of a hardware implementation for an apparatus 1302. The apparatus 1302 is a radar signal sensing device and includes an RF baseband processor 1304 (also referred to as a modem) coupled to an RF transceiver 1322. In some examples, the apparatus may be capable of wireless communication in addition to radar signal sensing. For example, the apparatus may be a radar device, a UE, a base station, or another access point that is capable of radar signal sensing. If the radar signal sensing device is a UE, the processor may be coupled to one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the RF transceiver 1322 with the UE 104 and/or BS 102/180. The RF baseband processor 1304 may include a computer-readable medium/memory. The computer-readable medium/memory may be non-transitory. The RF baseband processor 1304 is responsible for general processing, including the execution of software stored on the computer-readable medium/memory. The software, when executed by the RF baseband processor 1304, causes the RF baseband processor 1304 to perform the various functions described supra. The computer-readable medium/memory may also be used for storing data that is manipulated by the RF baseband processor 1304 when executing software. The RF baseband processor 1304 further includes a reception component 1330, an RF sensing manager 1332, and a transmission component 1334. The RF sensing manager 1332 includes the one or more illustrated components. The components within the RF sensing manager 1332 may be stored in the computer-readable medium/memory and/or configured as hardware within the RF baseband processor 1304. The cellular baseband processor 1304 may be a component of the wireless device 350 and may include the memory 360 and/or at least one of the TX processor 368, the RX processor 356, and the controller/processor 359. In one configuration, the apparatus 1302 may be a modem chip and include just the RF baseband processor 1304, and in another configuration, the apparatus 1302 may be the entire RF sensing device (e.g., radar device 103) and include the additional modules of the apparatus 1302.

The reception component 1330 is configured, e.g., as described in connection with 1102, 1108, 1110, 1114, and 1118, to receive broadcast information indicative of a wireless device group that includes a first wireless device; to receive, based on the request, an indication of whether the second wireless device is granted membership to the wireless device group that includes the first wireless device; to receive a transmission schedule from the first wireless device when the second wireless device is granted membership to the wireless device group that includes the first wireless device; to receive a request from the first wireless device for the second wireless device to resign from the wireless device group subsequent to the second wireless device being granted membership to the wireless device group; and to receive a resignation of the first wireless device from the wireless device group subsequent to the second wireless device being granted membership to the wireless device group.

The RF sensing manager 1332 includes an estimation component 1340 that is configured, e.g., as described in connection with 1104, to estimate at least one of a range, a direction, or a Doppler metric of a target based on the broadcast information—the broadcast information indicates at least one of a location, a speed, a bearing, a FOV, a waveform, a group ID, or a group member ID. The transmission component 1334 is configured, e.g., as described in connection with 1106, 1112, and 1116, to transmit, to the first wireless device based on the broadcast information, a request to join the wireless device group that includes the first wireless device; to transmit one or more wireless signals based on the transmission schedule received from the first wireless device; and to transmit, to the first wireless device, at least one of a request to resign from the wireless device group or a resignation from the wireless device group subsequent to the second wireless device being granted membership to the wireless device group.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the RF baseband processor 1304, includes means for receiving broadcast information indicative of a wireless device group that includes a first wireless device; means for transmitting, to the first wireless device based on the broadcast information, a request to join the wireless device group that includes the first wireless device; and means for receiving, based on the request, an indication of whether the second wireless device is granted membership to the wireless device group that includes the first wireless device. The apparatus 1302 further includes means for receiving a transmission schedule from the first wireless device when the second wireless device is granted membership to the wireless device group that includes the first wireless device. The apparatus 1302 further includes means for transmitting one or more wireless signals based on the transmission schedule received from the first wireless device. The apparatus 1302 further includes means for estimating at least one of a range, a direction, or a Doppler metric of a target based on the broadcast information, the broadcast information indicating at least one of a location, a speed, a bearing, a field of view, a waveform, a group ID, or a group member ID. The apparatus 1302 further includes means for receiving a request from the first wireless device for the second wireless device to resign from the wireless device group subsequent to the second wireless device being granted membership to the wireless device group. The apparatus 1302 further includes means for transmitting, to the first wireless device, at least one of a request to resign from the wireless device group or a resignation from the wireless device group subsequent to the second wireless device being granted membership to the wireless device group. The apparatus 1302 further includes means for receiving a resignation of the first wireless device from the wireless device group subsequent to the second wireless device being granted membership to the wireless device group.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device, comprising: receiving, from a second wireless device, a request to join a wireless device group that includes the first wireless device, the request based on broadcast information indicative of the wireless device group; transmitting, to the second wireless device based on the request, a grant to join the wireless device group that includes the first wireless device; and transmitting a transmission schedule to at least one wireless device of the wireless device group, the at least one wireless device including the second wireless device.

Aspect 2 may be combined with aspect 1 and further includes broadcasting the information indicative of the wireless device group that includes the first wireless device, the broadcast information indicating at least one of a location, a speed, a bearing, a field of view, a waveform, a group ID, or a group member ID.

Aspect 3 may be combined with any of aspects 1-2 and further includes determining whether to grant membership in the wireless device group to the second wireless device, the transmission of the grant to the second wireless device based on a positive determination to grant the membership in the wireless device group to the second wireless device.

Aspect 4 may be combined with any of aspects 1-3 and further includes transmitting a rejection of the request from the second wireless device to join the wireless device group, the transmission of the rejection of the request based on a negative determination to grant the membership in the wireless device group to the second wireless device.

Aspect 5 may be combined with any of aspects 1-4 and further includes receiving information associated with a transmission by the at least one wireless device of the wireless device group, the transmission schedule determined based on the information associated with the transmission.

Aspect 6 may be combined with any of aspects 1-5 and includes that the grant to join the wireless device group causes a group leader position of the wireless device group to be transferred from the first wireless device to the second wireless device.

Aspect 7 may be combined with any of aspects 1-6 and further includes transmitting a request to the at least one wireless device to resign from the wireless device group based on at least one of a radar measurement or sidelink communication.

Aspect 8 may be combined with any of aspects 1-6 and further includes receiving, from the at least one wireless device, at least one of a request to resign from the wireless device group or a resignation from the wireless device group.

Aspect 9 may be combined with any of aspects 1-8 and further includes soliciting at least one other wireless device to join the wireless device group that includes the first wireless device, the at least one other wireless device included in a second wireless device group that does not include the first wireless device at a time of the solicitation.

Aspect 10 may be combined with any of aspects 1-9 and further includes broadcasting, to the wireless device group, a resignation of at least one of the first wireless device from the wireless device group or the at least one wireless device from the wireless device group.

Aspect 11 may be combined with any of aspects 1-10 and includes that the broadcast of the resignation causes at least one of the wireless device group to be terminated or a group leader position of the wireless device group to be transferred from the first wireless device to the at least one wireless device when the broadcast of the resignation is for the first wireless device.

Aspect 12 is a method of wireless communication at a second wireless device, comprising: receiving broadcast information indicative of a wireless device group that includes a first wireless device; transmitting, to the first wireless device based on the broadcast information, a request to join the wireless device group that includes the first wireless device; and receiving, based on the request, an indication of whether the second wireless device is granted membership to the wireless device group that includes the first wireless device.

Aspect 13 may be combined with aspect 12 and further includes receiving a transmission schedule from the first wireless device when the second wireless device is granted membership to the wireless device group that includes the first wireless device.

Aspect 14 may be combined with any of aspects 12-13 and further includes transmitting one or more wireless signals based on the transmission schedule received from the first wireless device.

Aspect 15 may be combined with any of aspects 12-14 and includes that the indication of whether the second wireless device is granted membership to the wireless device group that includes the first wireless device is a rejection of the request to join the wireless device group.

Aspect 16 may be combined with any of aspects 12-15 and includes that the second wireless device is configured as a group leader of the wireless device group when the second wireless device is granted membership to the wireless device group that includes the first wireless device.

Aspect 17 may be combined with any of aspects 12-16 and includes that the broadcast is included in a plurality of broadcasts received from a plurality of wireless devices of different wireless device groups, the transmission of the request to the first wireless device based on a selection of the broadcast from the plurality of broadcasts.

Aspect 18 may be combined with any of aspects 12-17 and further includes estimating at least one of a range, a direction, or a Doppler metric of a target based on the broadcast information, the broadcast information indicating at least one of a location, a speed, a bearing, a field of view, a waveform, a group ID, or a group member ID.

Aspect 19 may be combined with any of aspects 12-18 and further includes receiving a request from the first wireless device for the second wireless device to resign from the wireless device group subsequent to the second wireless device being granted membership to the wireless device group.

Aspect 20 may be combined with any of aspects 12-18 and further includes transmitting, to the first wireless device, at least one of a request to resign from the wireless device group or a resignation from the wireless device group subsequent to the second wireless device being granted membership to the wireless device group.

Aspect 21 may be combined with any of aspects 12-18 and further includes receiving a resignation of the first wireless device from the wireless device group subsequent to the second wireless device being granted membership to the wireless device group.

Aspect 22 may be combined with any of aspects 12-18 or 21 and includes that the resignation causes at least one of the wireless device group to be terminated or a group leader position of the wireless device group to be transferred from the first wireless device to another wireless device included in the wireless device group.

Aspect 23 is an apparatus for wireless communication including at least one processor coupled to a memory and configured to implement a method as in any of aspects 1-11.

Aspect 24 is an apparatus for wireless communication including means for implementing a method as in any of aspects 1-11.

Aspect 25 is a computer-readable medium storing computer executable code, where the code when executed by a processor causes the processor to implement a method as in any of aspects 1-11.

Aspect 26 is an apparatus for wireless communication including at least one processor coupled to a memory and configured to implement a method as in any of aspects 12-22.

Aspect 27 is an apparatus for wireless communication including means for implementing a method as in any of aspects 12-22.

Aspect 28 is a computer-readable medium storing computer executable code, where the code when executed by a processor causes the processor to implement a method as in any of aspects 12-22.

What is claimed is:

1. A method of wireless communication at a first wireless radar device, comprising:
   receiving, from a second wireless radar device, a request to join a wireless radar device group that includes the first wireless radar device, the request based on broadcast information indicative of the wireless radar device group;
   transmitting, to the second wireless radar device based on the request, a grant to join the wireless radar device group that includes the first wireless radar device;
   transmitting a radar pulse transmission schedule to at least one wireless radar device of the wireless radar device group, the at least one wireless radar device including the second wireless radar device; and
   transmitting a radar pulse based on the radar pulse transmission schedule for the second wireless radar device to estimate at least one of a location, a range, a direction, or a Doppler metric of a target reflecting the transmitted radar pulse to the second wireless radar device.

2. The method of claim 1, further comprising broadcasting the broadcast information indicative of the wireless radar device group that includes the first wireless radar device, the broadcast information indicating a radar pulse waveform.

3. The method of claim 1, further comprising receiving information associated with a radar transmission by the at least one wireless radar device of the wireless radar device group, the radar pulse transmission schedule determined based on the information associated with the radar transmission.

4. The method of claim 1, further comprising transmitting a second request to the at least one wireless radar device to resign from the wireless radar device group based on at least one of a radar measurement or sidelink communication.

5. The method of claim 1, further comprising soliciting at least one other wireless radar device to join the wireless radar device group that includes the first wireless radar device by transmitting a solicitation request to the at least one other wireless radar device, the at least one other wireless radar device included in a second wireless radar device group that does not include the first wireless radar device at a time of the solicitation, the solicitation request being based on an improved location of the at least one other wireless radar device to broadcast the broadcast information to the wireless radar device group.

6. The method of claim 1, further comprising broadcasting, to the wireless radar device group, a resignation of at least one of the first wireless radar device from the wireless radar device group or the at least one wireless radar device from the wireless radar device group.

7. The method of claim 6, wherein the broadcast of the resignation causes at least one of the wireless radar device group to be terminated or a group leader position of the wireless radar device group to be transferred from the first wireless radar device to the at least one wireless radar device when the broadcast of the resignation is for the first wireless radar device.

8. A method of wireless communication at a second wireless radar device, comprising:
   receiving broadcast information indicative of a wireless radar device group that includes a first wireless radar device;
   transmitting, to the first wireless radar device based on the broadcast information, a request to join the wireless radar device group that includes the first wireless radar device;
   receiving, based on the request, an indication of whether the second wireless radar device is granted membership to the wireless radar device group that includes the first wireless radar device;
   receiving a radar pulse transmission schedule from the first wireless radar device when the second wireless radar device is granted membership to the wireless radar device group that includes the first wireless radar device; and
   estimating at least one of a location, a range, a direction, or a Doppler metric of a target based on at least one reflection of at least one radar pulse transmitted from a wireless radar device of the wireless radar device group other than the second wireless radar device and based on the broadcast information.

9. The method of claim 8, further comprising transmitting one or more radar pulses based on the radar pulse transmission schedule received from the first wireless radar device.

10. The method of claim 8, wherein the indication of whether the second wireless radar device is granted membership to the wireless radar device group that includes the first wireless radar device is a rejection of the request to join the wireless radar device group.

11. The method of claim 8, wherein the second wireless radar device is configured as a group leader of the wireless radar device group when the second wireless radar device is granted membership to the wireless radar device group that includes the first wireless radar device.

12. The method of claim 8, wherein the broadcast information is included in a plurality of broadcasts received from a plurality of wireless radar devices of different wireless radar device groups, the transmission of the request to the first wireless radar device based on a selection of the broadcast information from the plurality of broadcasts.

13. The method of claim 8, wherein the broadcast information indicates at least one of a second location, a speed, a bearing, a field of view, a waveform, a group identifier (ID), or a group member ID.

14. The method of claim 8, further comprising receiving a resignation of the first wireless radar device from the wireless radar device group subsequent to the second wireless radar device being granted membership to the wireless radar device group.

15. The method of claim 14, wherein the resignation causes at least one of the wireless radar device group to be terminated or a group leader position of the wireless radar device group to be transferred from the first wireless radar device to another wireless radar device included in the wireless radar device group.

16. An apparatus for wireless communication at a first wireless radar device, comprising:
   a memory; and
   at least one processor coupled to the memory and configured to:
      receive, from a second wireless radar device, a request to join a wireless radar device group that includes the first wireless radar device, the request based on broadcast information indicative of the wireless radar device group;
      transmit, to the second wireless radar device based on the request, a grant to join the wireless radar device group that includes the first wireless radar device;
      transmit a radar pulse transmission schedule to at least one wireless radar device of the wireless radar device group, the at least one wireless radar device including the second wireless radar device; and
      transmit a radar pulse based on the radar pulse transmission schedule for the second wireless radar device to estimate at least one of a location, a range, a direction, or a Doppler metric of a target reflecting the transmitted radar pulse.

17. The apparatus of claim 16, wherein the at least one processor is further configured to broadcast the broadcast information indicative of the wireless radar device group that includes the first wireless radar device, the broadcast information indicating a radar pulse waveform.

18. The apparatus of claim 16, wherein the at least one processor is further configured to determine whether to grant membership in the wireless radar device group to the second wireless radar device, the transmission of the grant to the second wireless radar device based on a positive determination to grant the membership in the wireless radar device group to the second wireless radar device.

19. The apparatus of claim 16, wherein the at least one processor is further configured to broadcast receive information associated with a transmission by the at least one wireless radar device of the wireless radar device group, the radar pulse transmission schedule determined based on the information associated with the transmission.

20. An apparatus for wireless communication at a second wireless radar device, comprising:
   a memory; and
   at least one processor coupled to the memory and configured to:
      receive broadcast information indicative of a wireless radar device group that includes a first wireless radar device;
      transmit, to the first wireless radar device based on the broadcast information, a request to join the wireless radar device group that includes the first wireless radar device;
      receive, based on the request, an indication of whether the second wireless radar device is granted membership to the wireless radar device group that includes the first wireless radar device;
      receive a radar pulse transmission schedule from the first wireless radar device when the second wireless radar device is granted membership to the wireless radar device group that includes the first wireless radar device; and
      estimate at least one of a location, a range, a direction, or a Doppler associated with a target device based at least one reflection of at least one radar pulse transmitted from a wireless radar device of the wireless radar device group other than the second wireless radar device.

21. The apparatus of claim 20, wherein the at least one processor is further configured to transmit one or more radar pulses based on the radar pulse transmission schedule received from the first wireless radar device.

22. The apparatus of claim 20, wherein the second wireless radar device is configured as a group leader of the wireless radar device group when the second wireless radar device is granted membership to the wireless radar device group that includes the first wireless radar device.

23. The apparatus of claim 17, wherein the broadcast information further includes the first wireless radar device, the broadcast information indicating at least one of a second location, a speed, a bearing, a field of view, a group identifier (ID), or a group member ID.

24. The apparatus of claim 16, wherein the at least one processor is further configured to:
receive at least one reflection of at least one radar pulse transmitted from the second wireless radar device based on the radar pulse transmission schedule.

25. The apparatus of claim 24, wherein the at least one processor is further configured to:
estimate at least one of the location, the range, the direction, or the Doppler associated with the target device based on the at least one reflection of the at least one radar pulse transmitted from the second wireless radar device based on the radar pulse transmission schedule.

26. The apparatus of claim 24, wherein the at least one processor is further configured to:
determine a congestion level based on a portion of received power that is not associated with a return signal of the first wireless radar device, wherein, to receive the at least one reflection of the at least one radar pulse, the at least one processor is further configured to receive the at least one reflection of the at least one radar pulse based on the congestion level.

27. The apparatus of claim 16, wherein the at least one processor is further configured to:
determine that a second location of the second wireless radar device is better for communicating with the wireless radar device group than a first location of the first wireless radar device; and
transfer a group leader position of the wireless radar device group from the first wireless radar device to the second wireless radar device.

28. The apparatus of claim 16, wherein the at least one processor is further configured to:
coordinate radar sensing among the wireless radar device group using sidelink communication.

29. The apparatus of claim 20, wherein the at least one processor is further configured to:
determine that the second wireless radar device is located physically close to the wireless radar device group based on the broadcast information, wherein, to transmit the request to join the wireless radar device group, the at least one processor is further configured to transmit the request to join the wireless radar device group in response to the determination that the second wireless radar device is located physically close to the wireless radar device group.

* * * * *